(12) United States Patent
Hsieh et al.

(10) Patent No.: US 11,409,079 B2
(45) Date of Patent: Aug. 9, 2022

(54) OPTICAL IMAGING LENS

(71) Applicant: Genius Electronic Optical (Xiamen) Co., Ltd., Fujian (CN)

(72) Inventors: Hung-Chien Hsieh, Taichung (TW); Ou Zhou, Fujian (CN); Lanlan Zhang, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 225 days.

(21) Appl. No.: 16/566,898

(22) Filed: Sep. 11, 2019

(65) Prior Publication Data

US 2020/0409066 A1 Dec. 31, 2020

(30) Foreign Application Priority Data

Jun. 25, 2019 (CN) .......................... 201910553150.8

(51) Int. Cl.
*G02B 9/34* (2006.01)
*G02B 13/00* (2006.01)
*G02B 15/14* (2006.01)

(52) U.S. Cl.
CPC ....... *G02B 13/004* (2013.01); *G02B 15/1441* (2019.08); *G02B 9/34* (2013.01)

(58) Field of Classification Search
CPC .... G02B 13/004; G02B 15/1441; G02B 9/34; G02B 3/04; G02B 13/18; G02B 15/144
See application file for complete search history.

(56) References Cited

U.S. PATENT DOCUMENTS

| | | | |
|---|---|---|---|
| 2020/0225453 A1* | 7/2020 | Wenren | G02B 9/62 |
| 2020/0264411 A1* | 8/2020 | Huang | G02B 13/0045 |
| 2021/0048622 A1* | 2/2021 | Zhang | G02B 13/0045 |
| 2021/0055513 A1* | 2/2021 | Li | G02B 9/60 |
| 2021/0063690 A1* | 3/2021 | Huh | G02B 27/0025 |

FOREIGN PATENT DOCUMENTS

CN 106997089 * 8/2017 ............. G02B 13/00

* cited by examiner

*Primary Examiner* — Joseph P Martinez
(74) *Attorney, Agent, or Firm* — Winston Hsu

(57) ABSTRACT

An optical imaging lens includes a first lens element, a second lens, an aperture stop, a third lens element and a fourth lens element from an object side to an image side in order along an optical axis, and each lens element has an object-side surface and an image-side surface. An optical axis of the image-side surface of the first lens element is convex and an optical axis of the image-side surface of the fourth lens element is concave. HFOV stands for the half field of view of the entire optical imaging lens and TTL is a distance from the object-side surface of the first lens element to an image plane along the optical axis to satisfy HFOV/TTL≤1.500°/mm.

21 Claims, 28 Drawing Sheets

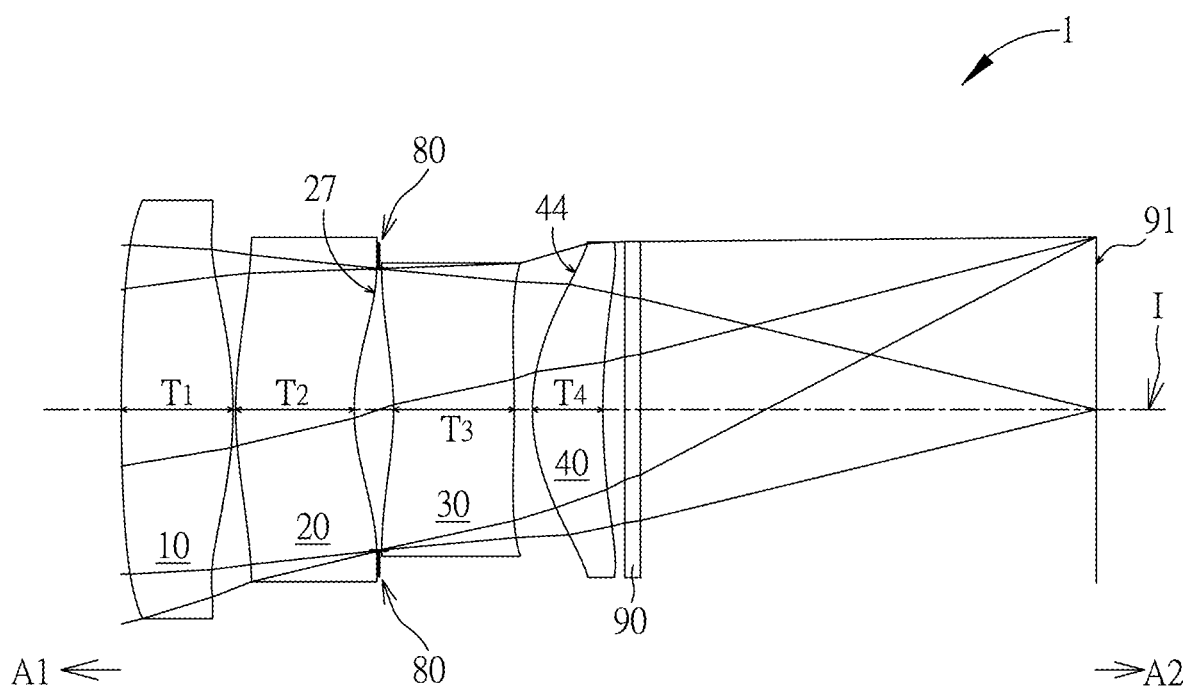
FIG. 14
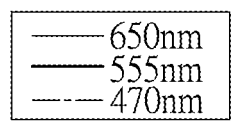
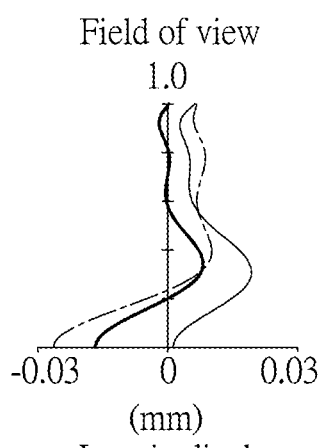 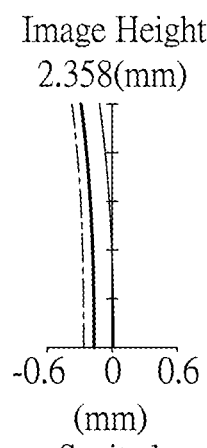 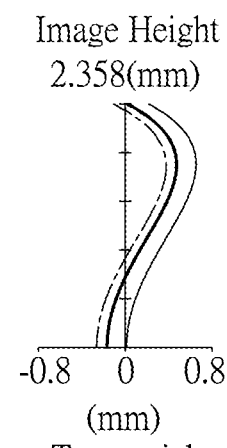 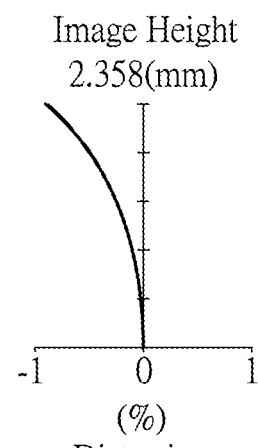
FIG. 15A    FIG. 15B   FIG. 15C   FIG. 15D

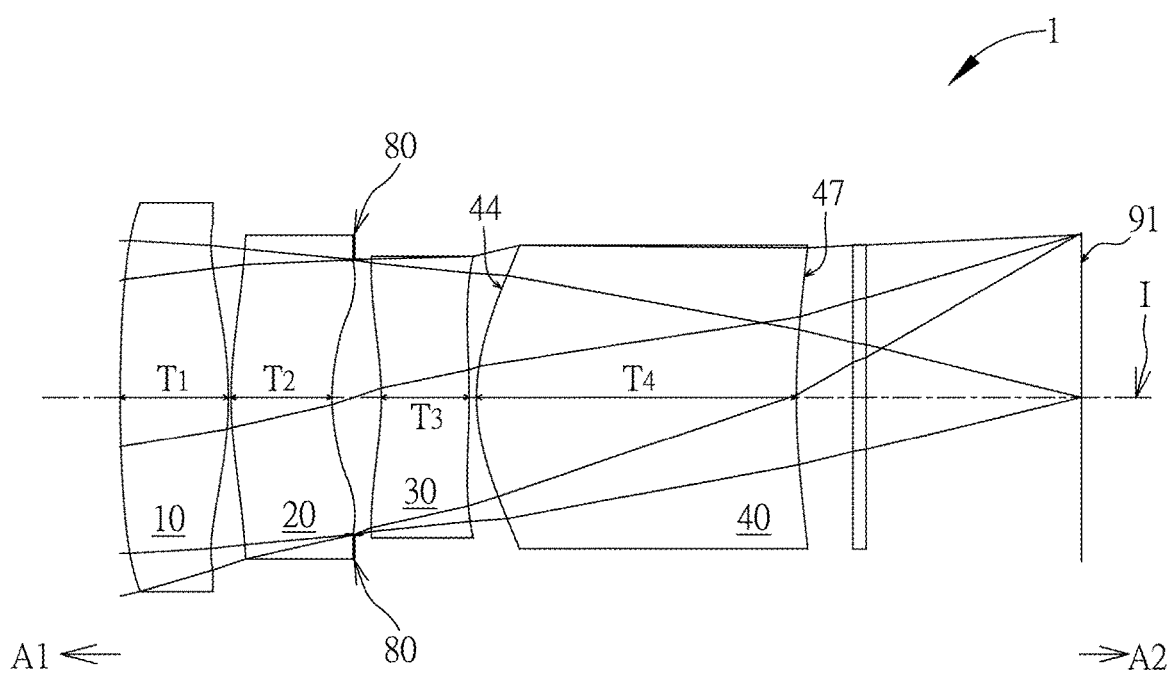
FIG. 16
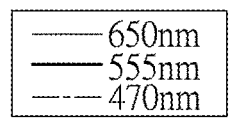
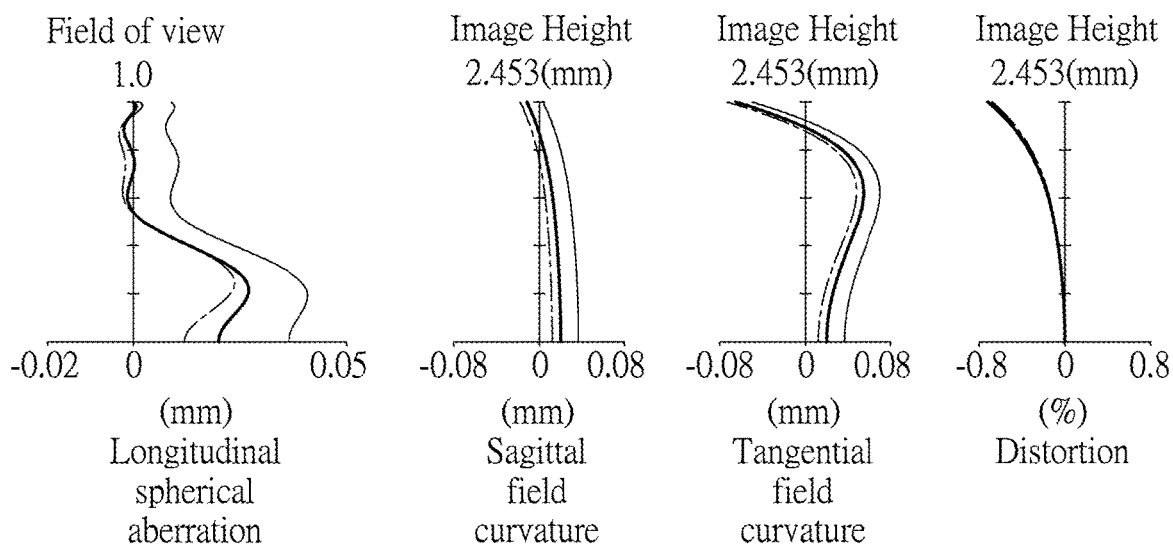
FIG. 17A    FIG. 17B   FIG. 17C  FIG. 17D

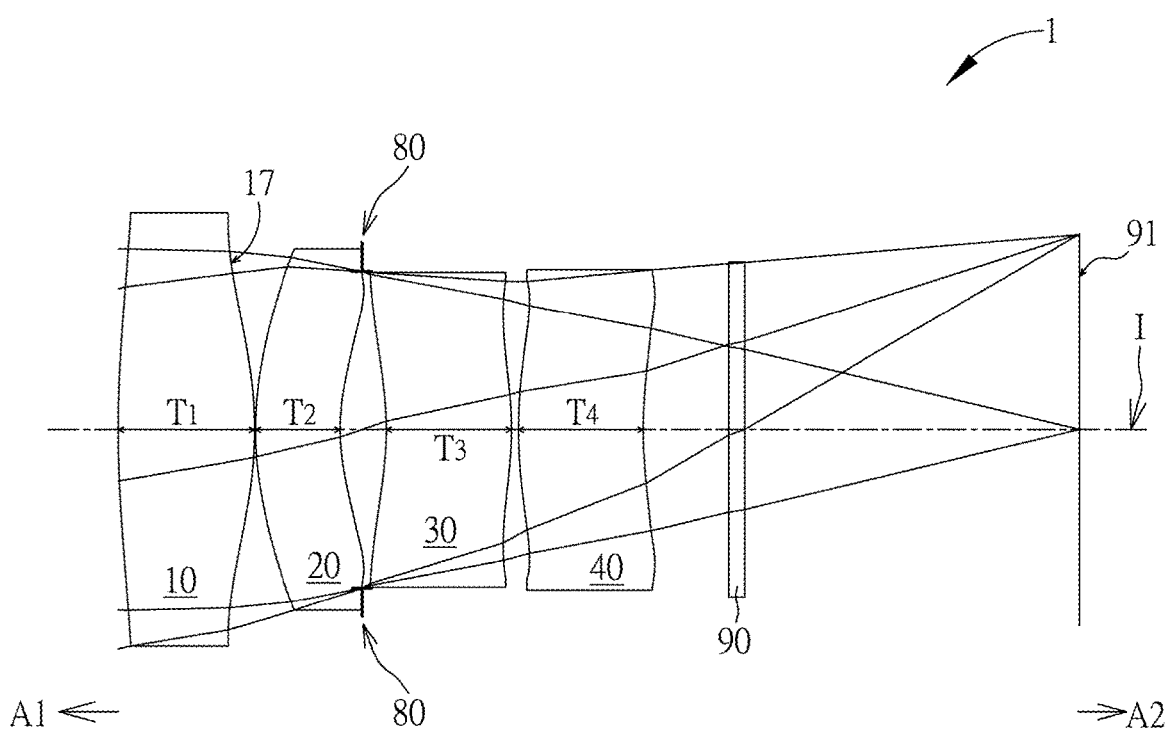
FIG. 18
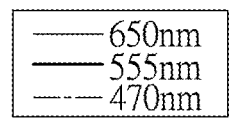
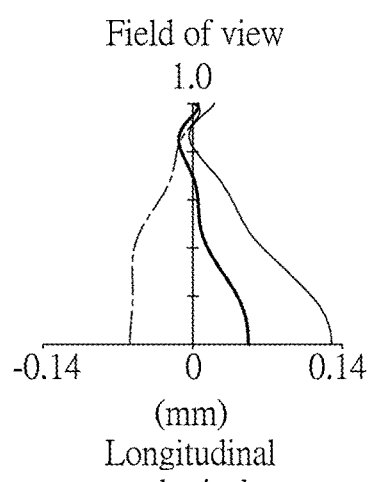 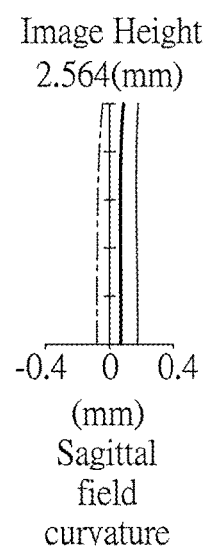 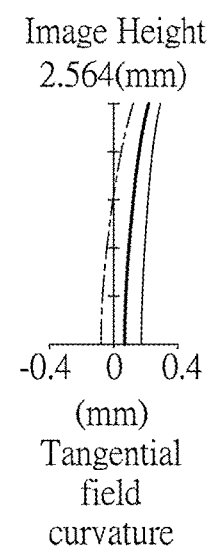 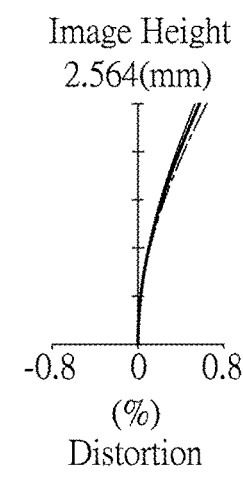
FIG. 19A    FIG. 19B    FIG. 19C    FIG. 19D

| First Embodiment | | | | | | | |
|---|---|---|---|---|---|---|---|
| EFL=9.333mm, HFOV=14.000 Degrees, TTL=9.335mm, Fno=1.800, ImgH=2.314mm | | | | | | | |
| No. | | Radius (mm) | Aperture stop Distance/ Lens Thickness/ Air Gap (mm) | | Refractive Index | Abbe No. | Focal Length (mm) | Effective Radius (mm) |
| | Object | INFINITY | INFINITY | | | | | |
| 11 | First Lens | 2.990 | 1.516 | T1 | 1.545 | 55.987 | 4.704 | 2.374 |
| 12 | | -15.000 | 0.042 | G12 | | | | 2.217 |
| 21 | Second Lens | 19.271 | 1.003 | T2 | 1.545 | 55.987 | -7.747 | 2.157 |
| 22 | | 3.406 | 0.142 | | | | | 1.815 |
| 80 | Aperture stop | INFINITY | 0.425 | G23 | | | | 1.661 |
| 31 | Third Lens | -2.135 | 0.330 | T3 | 1.661 | 20.373 | -7.370 | 1.592 |
| 32 | | -4.008 | 0.074 | G34 | | | | 1.463 |
| 41 | Fourth Lens | 3.414 | 1.935 | T4 | 1.545 | 55.987 | 10.535 | 1.467 |
| 42 | | 6.709 | 0.845 | G4F | | | | 1.753 |
| 90 | Filter | INFINITY | 0.210 | | 1.517 | 64.167 | | 1.876 |
| | | INFINITY | 2.813 | | | | | 1.897 |
| 91 | Image Plane | INFINITY | | | | | | 2.329 |

FIG. 22

| No. | 11 | 12 | 21 | 22 |
|---|---|---|---|---|
| K | 0.00000E+00 | 0.00000E+00 | 0.00000E+00 | 0.00000E+00 |
| $a_4$ | -1.03990E-03 | 8.89263E-03 | -7.99081E-03 | -6.81506E-02 |
| $a_6$ | -4.40661E-04 | -1.49722E-03 | -1.20072E-04 | 5.53837E-03 |
| $a_8$ | 1.67009E-04 | -1.85906E-04 | 1.22741E-04 | 5.44356E-04 |
| $a_{10}$ | -5.20676E-05 | 6.73042E-05 | 4.99855E-05 | -9.34939E-05 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 1.03402E-01 | 5.39566E-02 | -6.45939E-02 | -2.87587E-02 |
| $a_6$ | -1.42517E-02 | 3.25599E-02 | -7.31362E-03 | 1.49572E-02 |
| $a_8$ | 6.82176E-04 | -2.79175E-02 | 1.74411E-02 | -1.30337E-02 |
| $a_{10}$ | -2.07853E-04 | 1.07729E-02 | -1.02947E-02 | 6.22173E-03 |
| $a_{12}$ | 8.89567E-05 | 1.39898E-04 | 1.13592E-03 | -1.49535E-03 |
| $a_{14}$ | 9.12502E-05 | -2.00978E-03 | 4.07040E-04 | 1.51135E-04 |
| $a_{16}$ | -2.11403E-05 | 5.86643E-04 | -4.20865E-05 | -2.70167E-06 |

FIG. 23

| | | | Second Embodiment | | | | |
|---|---|---|---|---|---|---|---|
| | | | EFL=9.009mm, HFOV=13.997 Degrees, TTL=12.801mm, Fno=1.800, ImgH=2.306mm | | | | |
| No. | | Radius (mm) | Aperture stop Distance/ Lens Thickness/ Air Gap (mm) | Refractive Index | Abbe No. | Focal Length (mm) | Effective Radius (mm) |
| | Object | INFINITY | INFINITY | | | | |
| 11 | First Lens | 18.644 | 2.276 | T1 | 1.545 | 55.987 | 8.796 | 2.810 |
| 12 | | -6.194 | 0.373 | G12 | | | | 2.358 |
| 21 | Second Lens | 6.234 | 1.259 | T2 | 1.545 | 55.987 | -16.238 | 2.122 |
| 22 | | 3.400 | 0.199 | | | | | 1.896 |
| 80 | Aperture stop | INFINITY | 0.123 | G23 | | | | 1.858 |
| 31 | Third Lens | -6.547 | 1.616 | T3 | 1.661 | 20.373 | -10.343 | 1.856 |
| 32 | | -140.696 | 0.041 | G34 | | | | 1.780 |
| 41 | Fourth Lens | 2.475 | 1.891 | T4 | 1.545 | 55.987 | 6.696 | 1.868 |
| 42 | | 5.589 | 0.845 | G4F | | | | 1.906 |
| 90 | Filter | INFINITY | 0.210 | | 1.517 | 64.167 | | 1.957 |
| | | INFINITY | 3.9669 | | | | | 1.969 |
| 91 | Image Plane | INFINITY | | | | | | 2.314 |

FIG. 24

| No. | 11 | 12 | 21 | 22 |
|---|---|---|---|---|
| K | 0.00000E+00 | 0.00000E+00 | 0.00000E+00 | 0.00000E+00 |
| $a_4$ | -6.38621E-04 | 5.98905E-03 | -1.28619E-02 | -4.13165E-02 |
| $a_6$ | 2.12083E-05 | 5.17517E-04 | 7.93885E-04 | 1.92332E-03 |
| $a_8$ | 2.25376E-05 | -7.72248E-05 | 8.94260E-06 | -1.34733E-04 |
| $a_{10}$ | -1.09675E-06 | 1.08189E-05 | -1.43301E-05 | 1.25561E-05 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 3.26787E-02 | 2.16075E-02 | -1.68754E-02 | -3.47096E-03 |
| $a_6$ | -6.04080E-03 | -1.22360E-03 | -1.85258E-03 | -5.52169E-04 |
| $a_8$ | 7.36092E-04 | 4.20433E-04 | -6.18439E-05 | -3.03990E-04 |
| $a_{10}$ | -5.12736E-05 | -2.71833E-05 | 4.04583E-05 | 6.33226E-05 |
| $a_{12}$ | 4.62281E-06 | -5.85272E-07 | -2.11094E-05 | -8.19795E-06 |
| $a_{14}$ | -1.32218E-06 | -4.50106E-06 | 1.96824E-06 | 5.34823E-07 |
| $a_{16}$ | 1.95134E-07 | 5.99940E-07 | -3.11532E-07 | 7.81541E-09 |

FIG. 25

| \multicolumn{7}{c|}{Third Embodiment} |

| No. | | Radius (mm) | Aperture stop Distance/ Lens Thickness/ Air Gap (mm) | | Refractive Index | Abbe No. | Focal Length (mm) | Effective Radius (mm) |
|---|---|---|---|---|---|---|---|---|
| | Object | INFINITY | INFINITY | | | | | |
| 11 | First Lens | 50.001 | 1.522 | T1 | 1.545 | 55.987 | 12.764 | 1.977 |
| 12 | | -8.016 | 0.405 | G12 | | | | 1.630 |
| 21 | Second Lens | 5.220 | 1.439 | T2 | 1.545 | 55.987 | -12.726 | 1.441 |
| 22 | | 2.691 | 0.250 | | | | | 1.131 |
| 80 | Aperture stop | INFINITY | 0.141 | G23 | | | | 1.108 |
| 31 | Third Lens | -5.315 | 0.848 | T3 | 1.545 | 55.987 | 76.713 | 1.130 |
| 32 | | -4.982 | 0.040 | G34 | | | | 1.213 |
| 41 | Fourth Lens | 2.487 | 2.223 | T4 | 1.545 | 55.987 | 4.826 | 1.351 |
| 42 | | 30.000 | 1.000 | G4F | | | | 1.313 |
| 90 | Filter | INFINITY | 0.210 | | 1.517 | 64.167 | | 1.297 |
| | | INFINITY | 1.538 | | | | | 1.295 |
| 91 | Image Plane | INFINITY | | | | | | 1.284 |

EFL=5.071mm, HFOV=13.996 Degrees, TTL=9.616mm, Fno=1.800, ImgH=1.262mm

FIG. 26

| No. | 11 | 12 | 21 | 22 |
|---|---|---|---|---|
| K | 0.00000E+00 | 0.00000E+00 | 0.00000E+00 | 0.00000E+00 |
| $a_4$ | 2.66091E-03 | 1.15731E-02 | -1.28152E-02 | -5.08813E-02 |
| $a_6$ | 4.93266E-04 | 1.65892E-03 | 9.04428E-05 | -1.94250E-03 |
| $a_8$ | 1.55173E-04 | 6.44647E-05 | -5.28840E-04 | -8.37708E-04 |
| $a_{10}$ | -1.73994E-05 | 2.38826E-05 | -2.41562E-04 | 1.83731E-04 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 4.94301E-02 | 2.76176E-02 | -1.83431E-02 | 5.88062E-03 |
| $a_6$ | -1.59577E-03 | 2.91425E-03 | -2.09288E-03 | -7.09892E-03 |
| $a_8$ | 1.85507E-03 | 3.63565E-03 | 1.53071E-04 | -7.43661E-04 |
| $a_{10}$ | 2.90844E-04 | 1.36395E-03 | 5.92685E-04 | 7.77487E-04 |
| $a_{12}$ | 1.17723E-04 | 4.21519E-04 | 3.18830E-04 | 3.69658E-04 |
| $a_{14}$ | 1.09050E-05 | 8.87406E-05 | 7.71236E-05 | 5.20473E-05 |
| $a_{16}$ | -4.78508E-05 | 7.24221E-05 | -6.78880E-05 | -6.97837E-05 |

FIG. 27

| No. | | Radius (mm) | Aperture stop Distance/ Lens Thickness/ Air Gap (mm) | | Refractive Index | Abbe No. | Focal Length (mm) | Effective Radius (mm) |
|---|---|---|---|---|---|---|---|---|
| | Fourth Embodiment |||||||||
| | EFL=8.147mm, HFOV=13.996 Degrees, TTL=13.796mm, Fno=1.800, ImgH=2.062mm |||||||||
| | Object | INFINITY | INFINITY | | | | | |
| 11 | First Lens | 72.048 | 2.421 | T1 | 1.545 | 55.987 | 8.302 | 2.911 |
| 12 | | -4.782 | 0.067 | G12 | | | | 2.451 |
| 21 | Second Lens | 6.776 | 1.611 | T2 | 1.545 | 55.987 | -11.717 | 2.187 |
| 22 | | 3.015 | 0.381 | | | | | 1.761 |
| 80 | Aperture stop | INFINITY | 0.467 | G23 | | | | 1.696 |
| 31 | Third Lens | -3.918 | 1.371 | T3 | 1.661 | 20.373 | -11.553 | 1.717 |
| 32 | | -9.087 | 0.215 | G34 | | | | 1.874 |
| 41 | Fourth Lens | 2.941 | 2.507 | T4 | 1.545 | 55.987 | 5.984 | 2.058 |
| 42 | | 20.503 | 0.845 | G4F | | | | 2.095 |
| 90 | Filter | INFINITY | 0.210 | | 1.517 | 64.167 | | 2.091 |
| | | INFINITY | 3.701 | | | | | 2.090 |
| 91 | Image Plane | INFINITY | | | | | | 2.071 |

FIG. 28

| No. | 11 | 12 | 21 | 22 |
|---|---|---|---|---|
| K | 0.00000E+00 | 0.00000E+00 | 0.00000E+00 | 0.00000E+00 |
| $a_4$ | 8.34016E-04 | 5.23047E-03 | -1.43255E-02 | -3.97147E-02 |
| $a_6$ | -7.88780E-05 | 5.65541E-04 | 9.64193E-04 | 1.83678E-03 |
| $a_8$ | 2.53819E-05 | -5.72901E-05 | 1.11176E-05 | -1.78076E-04 |
| $a_{10}$ | -8.94347E-07 | 5.38195E-06 | -9.60398E-06 | 8.73304E-06 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 3.39038E-02 | 1.70310E-02 | -1.22310E-02 | -7.43862E-04 |
| $a_6$ | -5.99106E-03 | -2.50685E-03 | -9.41556E-04 | 5.19769E-05 |
| $a_8$ | 7.55096E-04 | 3.39692E-04 | 6.03069E-05 | -6.50749E-04 |
| $a_{10}$ | -6.33162E-05 | 3.07691E-06 | 3.51549E-05 | 2.93578E-04 |
| $a_{12}$ | -7.87472E-07 | 9.06193E-06 | -2.60875E-05 | -7.09981E-05 |
| $a_{14}$ | 1.64682E-06 | -7.48642E-06 | 4.41906E-06 | 8.64806E-06 |
| $a_{16}$ | -1.03879E-07 | 1.08615E-06 | -2.16271E-07 | -3.95010E-07 |

FIG. 29

| Fifth Embodiment | | | | | | | |
|---|---|---|---|---|---|---|---|
| EFL=9.371mm, HFOV=13.998 Degrees, TTL=13.306mm, Fno=1.800, ImgH=2.358mm | | | | | | | |
| No. | | Radius (mm) | Aperture stop Distance/ Lens Thickness/ Air Gap (mm) | Refractive Index | Abbe No. | Focal Length (mm) | Effective Radius (mm) |
| | Object | INFINITY | INFINITY | | | | |
| 11 | First Lens | 30.779 | 1.524 | T1 1.545 | 55.987 | 8.612 | 2.859 |
| 12 | | -5.456 | 0.038 | G12 | | | 2.560 |
| 21 | Second Lens | 5.769 | 1.618 | T2 1.545 | 55.987 | -12.376 | 2.351 |
| 22 | | 2.805 | 0.335 | | | | 1.935 |
| 80 | Aperture stop | INFINITY | 0.201 | G23 | | | 1.925 |
| 31 | Third Lens | -4.339 | 1.647 | T3 1.661 | 20.373 | -9.571 | 1.927 |
| 32 | | -15.602 | 0.248 | G34 | | | 2.002 |
| 41 | Fourth Lens | 2.662 | 0.964 | T4 1.545 | 55.987 | 6.252 | 2.270 |
| 42 | | 10.533 | 0.300 | G4F | | | 2.294 |
| 90 | Filter | INFINITY | 0.210 | 1.517 | 64.167 | | 2.296 |
| | | INFINITY | 6.221 | | | | 2.298 |
| 91 | Image Plane | INFINITY | | | | | 2.367 |

FIG. 30

| No. | 11 | 12 | 21 | 22 |
|---|---|---|---|---|
| K | 0.00000E+00 | 0.00000E+00 | 0.00000E+00 | 0.00000E+00 |
| $a_4$ | 1.19093E-03 | 5.34196E-03 | -1.32597E-02 | -3.79017E-02 |
| $a_6$ | -9.18089E-05 | 5.58374E-04 | 8.92469E-04 | 1.86961E-03 |
| $a_8$ | 3.38796E-05 | -5.92673E-05 | 1.01474E-06 | -1.67461E-04 |
| $a_{10}$ | -6.55077E-07 | 6.83585E-06 | -6.53555E-06 | -2.63338E-06 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 3.44221E-02 | 1.66887E-02 | -1.03184E-02 | 8.24149E-04 |
| $a_6$ | -5.77419E-03 | -2.24955E-03 | -1.32912E-03 | 1.71303E-04 |
| $a_8$ | 7.56761E-04 | 3.77710E-04 | -2.53478E-05 | -2.93929E-04 |
| $a_{10}$ | -5.10994E-05 | -1.02829E-05 | 4.74929E-05 | 5.08578E-05 |
| $a_{12}$ | 4.34164E-06 | 7.01844E-06 | -1.93323E-05 | -9.31234E-06 |
| $a_{14}$ | -1.42201E-06 | -3.01012E-06 | 1.85619E-06 | 5.56943E-07 |
| $a_{16}$ | 1.58823E-07 | 3.25169E-07 | -7.08450E-08 | 1.26838E-08 |

FIG. 31

| Sixth Embodiment |||||||
|---|---|---|---|---|---|---|
| EFL=9.742mm, HFOV=13.996 Degrees, TTL=14.410mm, Fno=1.800, ImgH=2.453mm |||||||
| No. | | Radius (mm) | Aperture stop Distance/ Lens Thickness/ Air Gap (mm) | Refractive Index | Abbe No. | Focal Length (mm) | Effective Radius (mm) |
| | Object | INFINITY | INFINITY | | | | |
| 11 | First Lens | 26.780 | 1.619 | T1 | 1.545 | 55.987 | 9.040 | 2.915 |
| 12 | | -5.925 | 0.040 | G12 | | | | 2.597 |
| 21 | Second Lens | 5.949 | 1.520 | T2 | 1.545 | 55.987 | -11.606 | 2.431 |
| 22 | | 2.792 | 0.326 | | | | | 2.066 |
| 80 | Aperture stop | INFINITY | 0.412 | G23 | | | | 2.062 |
| 31 | Third Lens | -4.534 | 1.310 | T3 | 1.661 | 20.373 | -11.114 | 2.074 |
| 32 | | -13.019 | 0.115 | G34 | | | | 2.113 |
| 41 | Fourth Lens | 3.051 | 4.795 | T4 | 1.545 | 55.987 | 6.278 | 2.277 |
| 42 | | 12.299 | 0.845 | G4F | | | | 2.244 |
| 90 | Filter | INFINITY | 0.210 | | 1.517 | 64.167 | | 2.277 |
| | | INFINITY | 3.219 | | | | | 2.284 |
| 91 | Image Plane | INFINITY | | | | | | 2.464 |

FIG. 32

| No. | 11 | 12 | 21 | 22 |
|---|---|---|---|---|
| K | 0.00000E+00 | 0.00000E+00 | 0.00000E+00 | 0.00000E+00 |
| $a_4$ | 1.24253E-03 | 4.99788E-03 | -1.37711E-02 | -3.75205E-02 |
| $a_6$ | -8.57145E-05 | 5.66872E-04 | 1.01544E-03 | 1.90323E-03 |
| $a_8$ | 2.55247E-05 | -5.96369E-05 | 9.88910E-06 | -1.66756E-04 |
| $a_{10}$ | -7.14667E-07 | 6.19438E-06 | -5.83704E-06 | -5.09916E-06 |
| $a_{12}$ | 0.00000E+00 | 0.00000E+00 | 0.00000E+00 | 0.00000E+00 |
| $a_{14}$ | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 |
| No. | 31 | 32 | 41 | 42 |
| K | 0.00000E+00 | 0.00000E+00 | 0.00000E+00 | 0.00000E+00 |
| $a_4$ | 3.39633E-02 | 1.71030E-02 | -1.15475E-02 | -9.51639E-04 |
| $a_6$ | -5.84114E-03 | -2.49723E-03 | -8.99116E-04 | 1.99865E-04 |
| $a_8$ | 7.44090E-04 | 3.65767E-04 | 4.23948E-05 | -2.46323E-04 |
| $a_{10}$ | -5.20822E-05 | -1.26743E-05 | 5.91566E-05 | 7.04347E-05 |
| $a_{12}$ | 4.38100E-06 | 6.81691E-06 | -1.82755E-05 | -9.71878E-06 |
| $a_{14}$ | -1.39635E-06 | -2.94381E-06 | 1.88174E-06 | 6.95351E-07 |
| $a_{16}$ | 1.56246E-07 | 3.08738E-07 | -5.27865E-08 | -2.07140E-08 |

FIG. 33

| | | | Seventh Embodiment | | | | |
|---|---|---|---|---|---|---|---|
| | EFL=10.070mm, HFOV=14.000 Degrees, TTL=12.579mm, Fno=1.800, ImgH=2.564mm |||||||
| No. | | Radius (mm) | Aperture stop Distance/ Lens Thickness/ Air Gap (mm) | | Refractive Index | Abbe No. | Focal Length (mm) | Effective Radius (mm) |
| | Object | INFINITY | INFINITY | | | | | |
| 11 | First Lens | 15.847 | 1.781 | T1 | 1.545 | 55.987 | 7.298 | 2.842 |
| 12 | | -5.115 | 0.010 | G12 | | | | 2.630 |
| 21 | Second Lens | 4.366 | 1.116 | T2 | 1.545 | 55.987 | -19.954 | 2.368 |
| 22 | | 2.836 | 0.286 | | | | | 2.080 |
| 80 | Aperture stop | INFINITY | 0.316 | G23 | | | | 2.077 |
| 31 | Third Lens | -4.099 | 1.633 | T3 | 1.661 | 20.373 | -217.859 | 2.064 |
| 32 | | -4.891 | 0.093 | G34 | | | | 1.948 |
| 41 | Fourth Lens | 6.413 | 1.639 | T4 | 1.545 | 55.987 | -796265551558.526 | 1.945 |
| 42 | | 5.834 | 1.117 | G4F | | | | 2.101 |
| 90 | Filter | INFINITY | 0.210 | | 1.517 | 64.167 | | 2.186 |
| | | INFINITY | 4.378 | | | | | 2.197 |
| 91 | Image Plane | INFINITY | | | | | | 2.567 |

FIG. 34

| No. | 11 | 12 | 21 | 22 |
|---|---|---|---|---|
| K | 0.00000E+00 | 0.00000E+00 | 0.00000E+00 | 0.00000E+00 |
| $a_4$ | -1.27455E-03 | 7.70228E-03 | -1.15867E-02 | -3.88969E-02 |
| $a_6$ | -1.15877E-04 | 2.23328E-04 | 1.38377E-03 | 1.80634E-03 |
| $a_8$ | 2.06817E-05 | -6.05841E-05 | 5.69594E-06 | -1.47409E-04 |
| $a_{10}$ | -1.07683E-06 | 6.50882E-06 | -1.00092E-05 | 3.36399E-07 |
| $a_{12}$ | 3.03775E-08 | 9.80559E-09 | -2.55434E-07 | 4.00038E-07 |
| $a_{14}$ | 3.11841E-09 | -1.14830E-08 | -2.03496E-08 | 6.06062E-08 |
| $a_{16}$ | -9.09980E-10 | -3.46291E-09 | 1.31981E-09 | 1.21979E-08 |
| No. | 31 | 32 | 41 | 42 |
| K | 0.00000E+00 | 0.00000E+00 | 0.00000E+00 | 0.00000E+00 |
| $a_4$ | 3.37371E-02 | 3.01834E-02 | -4.05236E-03 | -2.07509E-02 |
| $a_6$ | -5.79797E-03 | -2.70691E-03 | -1.99065E-03 | 3.36309E-03 |
| $a_8$ | 7.29313E-04 | 3.31305E-04 | -9.01208E-05 | -5.40743E-04 |
| $a_{10}$ | -5.33551E-05 | -1.85916E-05 | 5.43387E-05 | 1.74504E-05 |
| $a_{12}$ | 4.81808E-06 | 4.65920E-06 | -1.66306E-05 | -3.44015E-06 |
| $a_{14}$ | -1.22716E-06 | -3.39645E-06 | 1.70237E-06 | 2.18697E-06 |
| $a_{16}$ | 1.83044E-07 | 3.55656E-07 | -4.12355E-07 | -2.23817E-07 |

FIG. 35

| | | | Eighth Embodiment | | | | |
|---|---|---|---|---|---|---|---|
| | | EFL=9.149mm, HFOV=12.802 Degrees, TTL=9.150mm, Fno=1.800, ImgH=2.185mm | | | | | |
| No. | | Radius (mm) | Aperture stop Distance/ Lens Thickness/ Air Gap (mm) | | Refractive Index | Abbe No. | Focal Length (mm) | Effective Radius (mm) |
| | Object | INFINITY | INFINITY | | | | | |
| 11 | First Lens | 3.281 | 1.401 | T1 | 1.545 | 55.987 | 5.994 | 2.360 |
| 12 | | -1392.550 | 0.124 | G12 | | | | 2.145 |
| 21 | Second Lens | 4.704 | 0.501 | T2 | 1.545 | 55.987 | -18.796 | 1.945 |
| 22 | | 3.105 | 0.251 | | | | | 1.805 |
| 80 | Aperture stop | INFINITY | 0.151 | G23 | | | | 1.805 |
| 31 | Third Lens | -4.964 | 0.448 | T3 | 1.661 | 20.373 | -8.856 | 1.782 |
| 32 | | -32.173 | 0.138 | G34 | | | | 1.626 |
| 41 | Fourth Lens | 3.034 | 2.291 | T4 | 1.545 | 55.987 | 15.575 | 1.586 |
| 42 | | 3.457 | 0.845 | G4F | | | | 1.518 |
| 90 | Filter | INFINITY | 0.210 | | 1.517 | 64.167 | | 1.621 |
| | | INFINITY | 2.790 | | | | | 1.648 |
| 91 | Image Plane | INFINITY | | | | | | 2.204 |

FIG. 36

| No. | 11 | 12 | 21 | 22 |
|---|---|---|---|---|
| K | -1.15492E+00 | -6.10560E+01 | 2.23227E+00 | 1.25045E-01 |
| $a_4$ | 9.06515E-04 | 2.74464E-03 | -1.06370E-02 | -4.01837E-02 |
| $a_6$ | -2.15131E-04 | 5.21443E-04 | 1.88890E-03 | 2.46210E-03 |
| $a_8$ | 1.33268E-06 | -6.77490E-05 | 2.19942E-04 | -1.97887E-06 |
| $a_{10}$ | -5.29912E-06 | -3.93560E-06 | 2.82104E-05 | 5.86254E-05 |
| $a_{12}$ | -2.43230E-06 | 1.38849E-06 | -1.11301E-06 | -5.87653E-06 |
| $a_{14}$ | -6.55897E-08 | -8.75688E-07 | -2.10652E-06 | -6.82546E-06 |
| $a_{16}$ | 5.54981E-08 | 1.68525E-07 | 4.29962E-07 | 1.33726E-06 |
| No. | 31 | 32 | 41 | 42 |
| K | -1.20582E+00 | -5.06916E+01 | -1.95604E+00 | -1.38686E+00 |
| $a_4$ | 3.62225E-02 | 2.45671E-02 | -2.59704E-02 | -5.04630E-03 |
| $a_6$ | -5.85390E-03 | -1.33473E-03 | -3.76594E-03 | 1.26666E-02 |
| $a_8$ | 7.36718E-04 | 1.45081E-04 | 6.28218E-04 | -1.09465E-02 |
| $a_{10}$ | -1.07005E-04 | -1.96821E-05 | 1.28539E-04 | 2.76201E-03 |
| $a_{12}$ | -9.09169E-07 | 3.04977E-05 | -1.47880E-04 | 1.33261E-03 |
| $a_{14}$ | 4.15286E-06 | -4.06962E-05 | -2.29700E-05 | -9.23815E-04 |
| $a_{16}$ | -5.50104E-08 | 9.59364E-06 | 5.62119E-06 | 1.51161E-04 |

FIG. 37

| Embodiment | 1st | 2nd | 3rd | 4th | 5th | 6th | 7th | 8th |
|---|---|---|---|---|---|---|---|---|
| T1 | 1.516 | 2.276 | 1.522 | 2.421 | 1.524 | 1.619 | 1.781 | 1.401 |
| G12 | 0.042 | 0.373 | 0.405 | 0.067 | 0.038 | 0.040 | 0.010 | 0.124 |
| T2 | 1.003 | 1.259 | 1.439 | 1.611 | 1.618 | 1.520 | 1.116 | 0.501 |
| G23 | 0.567 | 0.322 | 0.391 | 0.848 | 0.536 | 0.738 | 0.602 | 0.402 |
| T3 | 0.330 | 1.616 | 0.848 | 1.371 | 1.647 | 1.310 | 1.633 | 0.448 |
| G34 | 0.074 | 0.041 | 0.040 | 0.215 | 0.248 | 0.115 | 0.093 | 0.138 |
| T4 | 1.935 | 1.891 | 2.223 | 2.507 | 0.964 | 4.795 | 1.639 | 2.291 |
| G4F | 0.845 | 0.845 | 1.000 | 0.845 | 0.300 | 0.845 | 1.117 | 0.845 |
| TF | 0.210 | 0.210 | 0.210 | 0.210 | 0.210 | 0.210 | 0.210 | 0.210 |
| GFP | 2.813 | 3.9669 | 1.538 | 3.701 | 6.221 | 3.219 | 4.378 | 2.790 |
| BFL | 3.868 | 5.022 | 2.748 | 4.757 | 6.731 | 4.274 | 5.705 | 3.846 |
| EFL | 9.333 | 9.009 | 5.071 | 8.147 | 9.371 | 9.742 | 10.742 | 11.742 |
| TL | 5.467 | 7.779 | 6.868 | 9.040 | 6.575 | 10.136 | 6.874 | 5.304 |
| TTL | 9.335 | 12.801 | 9.616 | 13.797 | 13.306 | 14.410 | 12.579 | 9.150 |
| ALT | 4.784 | 7.042 | 6.032 | 7.910 | 5.753 | 9.244 | 6.169 | 4.641 |
| AAG | 0.683 | 0.736 | 0.836 | 1.130 | 0.822 | 0.893 | 0.705 | 0.663 |
| HFOV | 14.000 | 13.997 | 13.996 | 13.996 | 13.998 | 13.996 | 14.000 | 12.802 |
| Fno | 1.800 | 1.800 | 1.800 | 1.800 | 1.800 | 1.800 | 1.800 | 1.800 |

FIG. 38

| Embodiment | 1st | 2nd | 3rd | 4th | 5th | 6th | 7th | 8th |
|---|---|---|---|---|---|---|---|---|
| EFL/TTL | 1.000 | 0.704 | 0.527 | 0.590 | 0.704 | 0.676 | 0.854 | 1.283 |
| ALT/AAG | 7.009 | 9.564 | 7.213 | 6.998 | 6.997 | 10.357 | 8.753 | 6.998 |
| (T4+BFL)/T1 | 3.828 | 3.038 | 3.265 | 3.000 | 5.049 | 5.602 | 4.123 | 4.379 |
| (EFL+T4)/(AAG+T1) | 5.125 | 3.619 | 3.093 | 3.000 | 4.405 | 5.789 | 4.980 | 6.797 |
| (T2+T4)/(G12+G23) | 4.825 | 4.530 | 4.599 | 4.499 | 4.498 | 8.117 | 4.502 | 5.312 |
| (G34+TL)/(T1+T3) | 3.002 | 2.009 | 2.915 | 2.441 | 2.152 | 3.500 | 2.041 | 2.943 |
| EFL/ALT | 1.951 | 1.279 | 0.841 | 1.030 | 1.629 | 1.054 | 1.741 | 2.530 |
| ALT/(T1+G34) | 3.010 | 3.039 | 3.861 | 3.000 | 3.246 | 5.333 | 3.292 | 3.015 |
| TTL/(T2+G23+T3) | 4.914 | 4.004 | 3.591 | 3.602 | 3.501 | 4.039 | 3.754 | 6.773 |
| EFL/(T1+G12) | 5.990 | 3.400 | 2.631 | 3.274 | 6.000 | 5.873 | 5.997 | 7.699 |
| TL/(G12+T2+G23) | 3.391 | 3.981 | 3.073 | 3.578 | 3.000 | 4.411 | 3.977 | 5.166 |
| BFL/(T3+G34) | 9.598 | 3.030 | 3.095 | 3.000 | 3.551 | 3.000 | 3.306 | 6.570 |
| (EFL+BFL)/ALT | 2.759 | 1.992 | 1.296 | 1.631 | 2.799 | 1.516 | 2.666 | 3.359 |
| TTL/(T1+G12+T3) | 4.945 | 3.001 | 3.465 | 3.575 | 4.146 | 4.854 | 3.674 | 4.638 |
| TTL/BFL | 2.413 | 2.549 | 3.500 | 2.900 | 1.977 | 3.372 | 2.205 | 2.379 |
| (T1+T2)/(G12+T3+G34) | 5.660 | 1.741 | 2.290 | 2.440 | 1.625 | 2.143 | 1.670 | 2.684 |
| HFOV/TTL | 1.500 | 1.093 | 1.455 | 1.014 | 1.052 | 0.971 | 1.113 | 1.399 |
| HFOV/EFL | 1.500 | 1.554 | 2.760 | 1.718 | 1.494 | 1.437 | 1.303 | 1.090 |
| TTL/AAG | 13.675 | 17.384 | 11.499 | 12.206 | 16.184 | 16.145 | 17.847 | 13.796 |
| (T1+G12+T2)/AAG | 3.752 | 5.307 | 4.026 | 3.627 | 3.867 | 3.561 | 4.125 | 3.055 |
| (T3+EFL)/BFL | 2.498 | 2.116 | 2.154 | 2.001 | 1.637 | 2.586 | 2.169 | 3.170 |
| (T4+BFL)/T2 | 5.784 | 5.492 | 3.454 | 4.507 | 4.757 | 5.966 | 6.579 | 12.245 |
| (T2+T4)/(T1+T3) | 1.592 | 0.809 | 1.545 | 1.086 | 0.814 | 2.156 | 0.807 | 1.510 |
| T4/(G12+G23) | 3.178 | 2.720 | 2.792 | 2.739 | 1.679 | 6.163 | 2.678 | 4.358 |
| (TTL+EFL)/ALT | 3.902 | 3.097 | 2.435 | 2.774 | 3.942 | 2.613 | 3.780 | 4.502 |
| TL/AAG | 8.009 | 10.564 | 8.213 | 7.998 | 7.997 | 11.357 | 9.753 | 7.998 |
| T4/(T1+AAG) | 0.880 | 0.628 | 0.943 | 0.706 | 0.411 | 1.909 | 0.659 | 1.109 |
| Fno*EFL/BFL | 4.343 | 3.229 | 3.322 | 3.083 | 2.506 | 4.103 | 3.389 | 5.496 |
| Fno*TTL/ALT | 3.512 | 3.272 | 2.870 | 3.140 | 4.163 | 2.806 | 3.670 | 3.549 |

FIG. 39

OPTICAL IMAGING LENS

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos.

2. Description of the Prior Art

The specification of the consumer's electronic products change all the time, so do the key components of those electronic products such as an optical imaging lens develop to have diverse applications to go further than just taking pictures or recording videos. Even a telescopic function is introduced to go with wide angle lens to have optical zoom function. The longer the effective focal length of the telescopic lens is, the higher the zoom ratio is.

However, with the increase of the effective focal length of the telescopic lens, a larger F number results in a smaller flux. Accordingly, it is still needed to have a longer effective focal length of the telescopic lens with a smaller F number, to keep the imaging quality, to make the fabrication easier and to improve the yield. The above issues are always important to research in this filed.

SUMMARY OF THE INVENTION

In the light of the above, examples in the present invention accordingly propose an optical imaging lens of four lens elements which is not only able to increase the effective focal length of the lens, to ensure the imaging quality, to have a smaller F number, to keep a good optical function, and is technically possible. The optical imaging lens of four lens elements of examples in the present invention from an object side toward an image side in order along an optical axis has a first lens element, a second lens element, a third lens element, and a fourth lens element. Each lens element from the first lens element to the fourth lens element respectively has an object-side surface which faces toward an object side to allow an imaging ray to pass through as well as an image-side surface which faces toward an image side to allow the imaging ray to pass through.

In order to facilitate clearness of the parameters represented by the present invention and the drawings, it is defined in this specification and the drawings: T1 is a thickness of the first lens element along the optical axis; T2 is a thickness of the second lens element along the optical axis; T3 is a thickness of the third lens element along the optical axis; T4 is a thickness of the fourth lens element along the optical axis. G12 is an air gap between the first lens element and the second lens element along the optical axis; G23 is an air gap between the second lens element and the third lens element along the optical axis; G34 is an air gap between the third lens element and the fourth lens element along the optical axis. ALT is a sum of thicknesses of all the four lens elements along the optical axis. AAG is a sum of three air gaps from the first lens element to the fourth lens element along the optical axis. In addition, TTL is a distance from the object-side surface of the first lens element to an image plane along the optical axis, and that is the system length of the optical imaging lens; EFL is an effective focal length of the optical imaging lens; TL is a distance from the object-side surface of the first lens element to the image-side surface of the fourth lens element along the optical axis; BFL is a distance from the image-side surface of the fourth lens element to the image plane along the optical axis; HFOV stands for a half field of view of the optical imaging lens; ImgH is an image height of the optical imaging lens.

Furthermore, a focal length of the first lens element 10 is f1; a focal length of the second lens element 20 is f2; a focal length of the third lens element 30 is f3; a focal length of the fourth lens element 40 is f4; a refractive index of the first lens element 10 is n1; a refractive index of the second lens element 20 is n2; a refractive index of the third lens element 30 is n3; a refractive index of the fourth lens element 40 is n4; an Abbe number of the first lens element 10 is $\upsilon 1$; an Abbe number of the second lens element 20 is $\upsilon 2$; an Abbe number of the third lens element 30 is $\upsilon 3$; and an Abbe number of the fourth lens element 40 is $\upsilon 4$. An effective radius of the object-side surface 11 of the first lens element 10 is r1; an effective radius of the image-side surface 12 of the first lens element 10 is r2; an effective radius of the object-side surface 21 of the second lens element 20 is r3; an effective radius of the image-side surface 22 of the second lens element 20 is r4; an effective radius of the object-side surface 31 of the third lens element 30 is r5; an effective radius of the image-side surface 32 of the third lens element 30 is r6; an effective radius of the object-side surface 41 of the fourth lens element 40 is r7; an effective radius of the image-side surface 42 of the fourth lens element 40 is r8.

In one embodiment, an optical axis region of the image-side surface of the first lens element is convex, an optical axis of the image-side surface of the fourth lens element is concave, and the aperture stop is disposed between the second lens element and the third lens element. Only the above-mentioned four lens elements of the optical imaging lens have refracting power, and the optical imaging lens satisfies the relationship: HFOV/TTL≤1.500°/mm.

In another embodiment, the first lens element has positive refracting power, an optical axis of the image-side surface of the fourth lens element is concave, and the aperture stop is disposed between the second lens element and the third lens element. Only the above-mentioned four lens elements of the optical imaging lens have refracting power, and the optical imaging lens satisfies the relationship: HFOV≤15.000°.

In still another embodiment, an optical axis region of the image-side surface of the first lens element is convex, the second lens element has negative refracting power, an optical axis of the object-side surface of the third lens element is concave, a periphery of the image-side surface of the third lens element is concave, and an optical axis of the image-side surface of the fourth lens element is concave. Only the above-mentioned four lens elements of the optical imaging lens have refracting power, and the optical imaging lens satisfies the relationship: HFOV/TTL≤1.500°/mm.

In the optical imaging lens of the present invention, the embodiments may also selectively satisfy the following optical conditions:

1. The first lens element has positive refracting power, an optical axis region of the image-side surface of the first lens element is convex, an optical axis region of the image-side surface of the third lens element is convex, an optical axis region of the image-side surface of the fourth lens element is concave, and the aperture stop is disposed between the second lens element and the third lens element.

2. The first lens element has positive refracting power, the third lens element has negative refracting power, an optical axis region of the image-side surface of the third lens element is convex, an optical axis region of the image-side surface of the fourth lens element is concave, and the aperture stop is disposed between the second lens element and the third lens element.

3. The first lens element has positive refracting power, an optical axis region of the image-side surface of the third lens element is convex, a periphery region of the image-side surface of the third lens element is concave, an optical axis region of the image-side surface of the fourth lens element is concave, and the aperture stop is disposed between the second lens element and the third lens element.

4. The third lens element has negative refracting power, the aperture stop is disposed between the second lens element and the third lens element, and HFOV≤15.000°.

5. An optical axis region of the object-side surface of the third lens element is concave, the aperture stop is disposed between the second lens element and the third lens element, and HFOV≤15.000°.

6. The fourth lens element has positive refracting power, the aperture stop is disposed between the second lens element and the third lens element, and HFOV≤15.000°.

7. The first lens element has positive refracting power, an optical axis region of the object-side surface of the second lens element is convex, the aperture stop is disposed between the second lens element and the third lens element, and HFOV≤15.000°.

8. The first lens element has positive refracting power, a periphery region of the object-side surface of the second lens element is convex, the aperture stop is disposed between the second lens element and the third lens element, and HFOV≤15.000°.

9. The first lens element has positive refracting power, an optical axis region of the object-side surface of the fourth lens element is convex, the aperture stop is disposed between the second lens element and the third lens element, and HFOV≤15.000°.

10. The first lens element has positive refracting power, a periphery region of the object-side surface of the fourth lens element is convex, the aperture stop is disposed between the second lens element and the third lens element, and HFOV≤15.000°.

11. The first lens element has positive refracting power, an optical axis region of the image-side surface of the fourth lens element is concave, the aperture stop is disposed between the second lens element and the third lens element, and HFOV≤15.000°.

12. An optical axis region of the image-side surface of the first lens element is convex, an optical axis region of the object-side surface of the third lens element is concave, an optical axis region of the image-side surface of the third lens element is convex, a periphery region of the image-side surface of the third lens element is concave, and HFOV≤15.000°.

13. An optical axis region of the image-side surface of the first lens element is convex, an optical axis region of the object-side surface of the third lens element is concave, a periphery region of the image-side surface of the third lens element is concave, an optical axis region of the image-side surface of the fourth lens element is concave, and HFOV≤15.000°.

14. An optical axis region of the image-side surface of the first lens element is convex, an optical axis region of the object-side surface of the third lens element is concave, a periphery region of the image-side surface of the third lens element is concave, a periphery region of the image-side surface of the fourth lens element is concave, and HFOV≤15.000°.

15. The second lens element has negative refracting power, the third lens element has negative refracting power, an optical axis region of the image-side surface of the third lens element is convex, a periphery region of the image-side surface of the third lens element is concave, a periphery region of the image-side surface of the fourth lens element is concave.

16. An optical axis region of the image-side surface of the first lens element is convex, the second lens element has negative refracting power, an optical axis region of the object-side surface of the second lens element is convex, an optical axis region of the object-side surface of the third lens element is concave, a periphery region of the image-side surface of the third lens element is concave, and a periphery region of the image-side surface of the fourth lens element is concave.

17. An optical axis region of the image-side surface of the first lens element is convex, the second lens element has negative refracting power, a periphery region of the object-side surface of the second lens element is convex, an optical axis region of the object-side surface of the third lens element is concave, a periphery region of the image-side surface of the third lens element is concave, and a periphery region of the image-side surface of the fourth lens element is concave.

18. An optical axis region of the image-side surface of the first lens element is convex, the second lens element has negative refracting power, the third lens element has negative refracting power, an optical axis region of the object-side surface of the third lens element is concave, a periphery region of the image-side surface of the third lens element is concave, and a periphery region of the image-side surface of the fourth lens element is concave.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 14 illustrates a fifth embodiment of the optical imaging lens of the present invention.

FIG. 15A illustrates the longitudinal spherical aberration on the image plane of the fifth embodiment.

FIG. 15B illustrates the field curvature aberration on the sagittal direction of the fifth embodiment.

FIG. 15C illustrates the field curvature aberration on the tangential direction of the fifth embodiment.

FIG. 15D illustrates the distortion aberration of the fifth embodiment.

FIG. 16 illustrates a sixth embodiment of the optical imaging lens of the present invention.

FIG. 17A illustrates the longitudinal spherical aberration on the image plane of the sixth embodiment.

FIG. 17B illustrates the field curvature aberration on the sagittal direction of the sixth embodiment.

FIG. 17C illustrates the field curvature aberration on the tangential direction of the sixth embodiment.

FIG. 17D illustrates the distortion aberration of the sixth embodiment.

FIG. 18 illustrates a seventh embodiment of the optical imaging lens of the present invention.

FIG. 19A illustrates the longitudinal spherical aberration on the image plane of the seventh embodiment.

FIG. 19B illustrates the field curvature aberration on the sagittal direction of the seventh embodiment.

FIG. 19C illustrates the field curvature aberration on the tangential direction of the seventh embodiment.

FIG. 19D illustrates the distortion aberration of the seventh embodiment.

FIG. 22 shows the optical data of the first embodiment of the optical imaging lens.

FIG. 23 shows the aspheric surface data of the first embodiment.

FIG. 24 shows the optical data of the second embodiment of the optical imaging lens.

FIG. 25 shows the aspheric surface data of the second embodiment.

FIG. 26 shows the optical data of the third embodiment of the optical imaging lens.

FIG. 27 shows the aspheric surface data of the third embodiment.

FIG. 28 shows the optical data of the fourth embodiment of the optical imaging lens.

FIG. 29 shows the aspheric surface data of the fourth embodiment.

FIG. 30 shows the optical data of the fifth embodiment of the optical imaging lens.

FIG. 31 shows the aspheric surface data of the fifth embodiment.

FIG. 32 shows the optical data of the sixth embodiment of the optical imaging lens.

FIG. 33 shows the aspheric surface data of the sixth embodiment.

FIG. 34 shows the optical data of the seventh embodiment of the optical imaging lens.

FIG. 35 shows the aspheric surface data of the seventh embodiment.

FIG. 36 shows the optical data of the eighth embodiment of the optical imaging lens.

FIG. 37 shows the aspheric surface data of the eighth embodiment.

FIG. 38 shows some important parameters in the embodiments.

FIG. 39 shows some important ratios in the embodiments.

DETAILED DESCRIPTION

Figure 1:
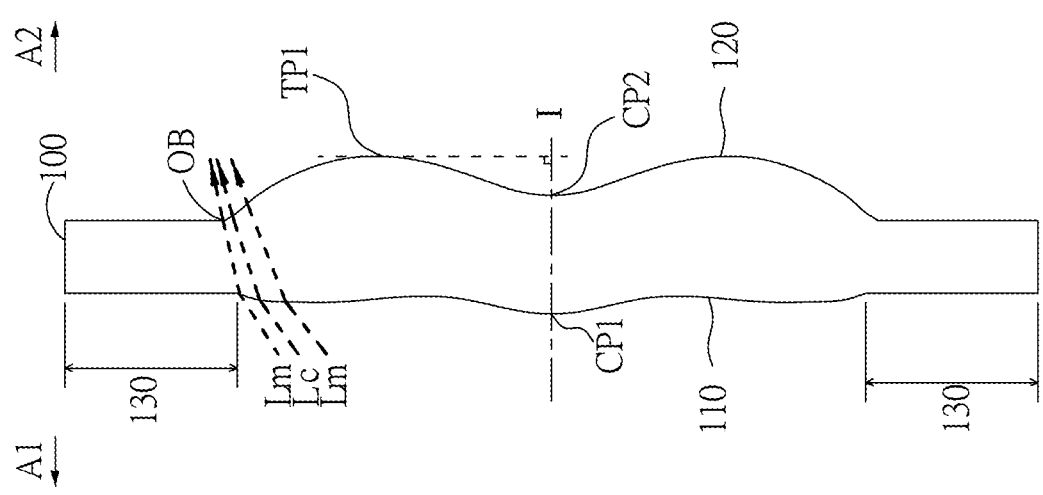

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
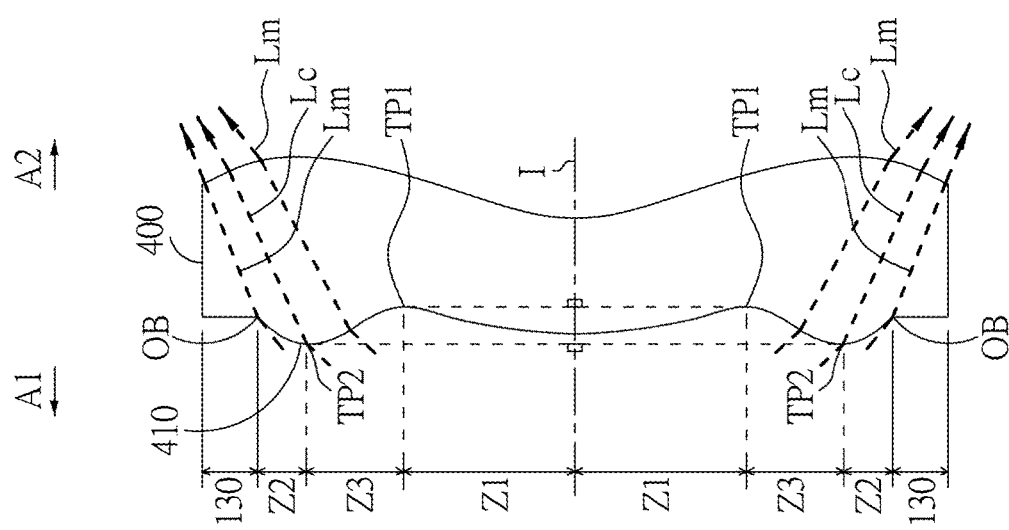

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
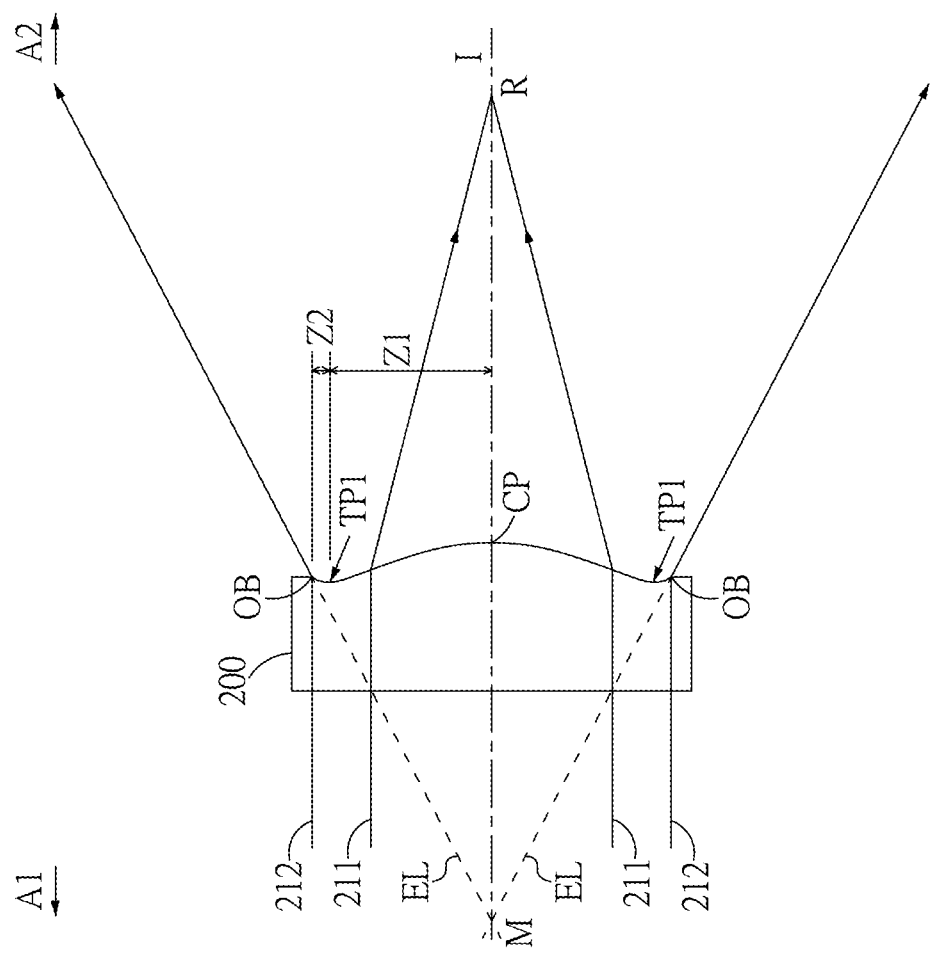
FIGS. 1-5 illustrate the methods for determining the surface shapes and for determining an optical axis region and a periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
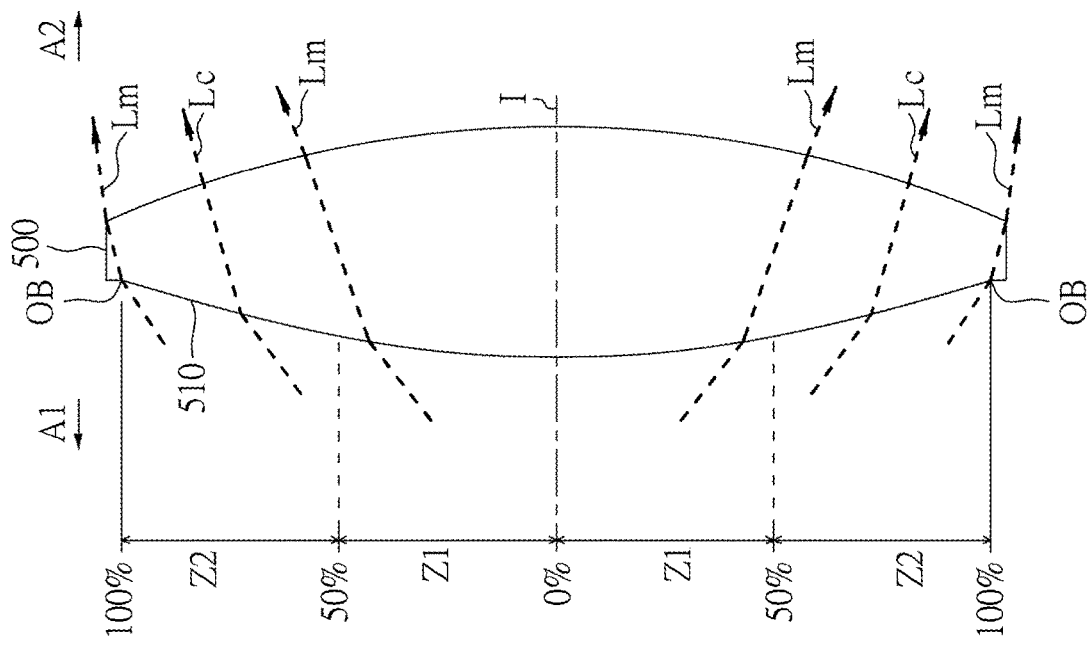
Figure 3:
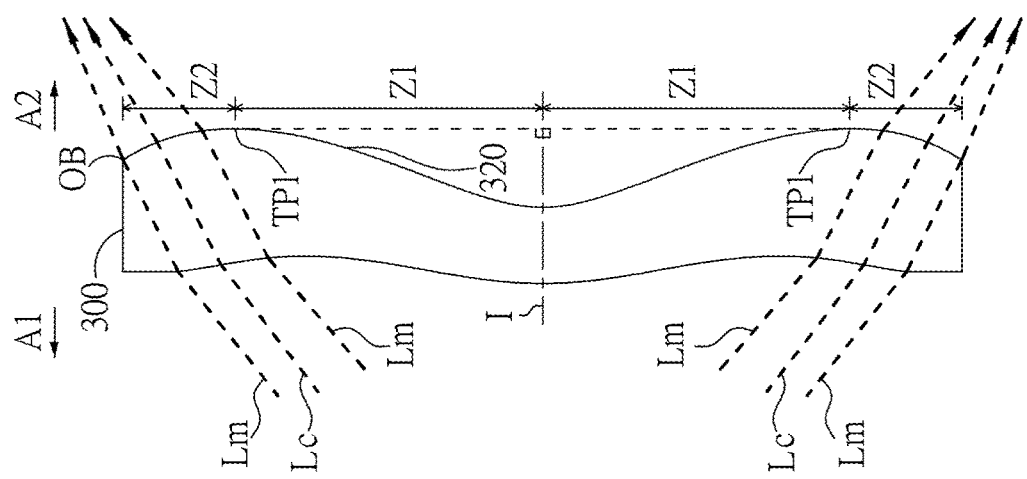

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
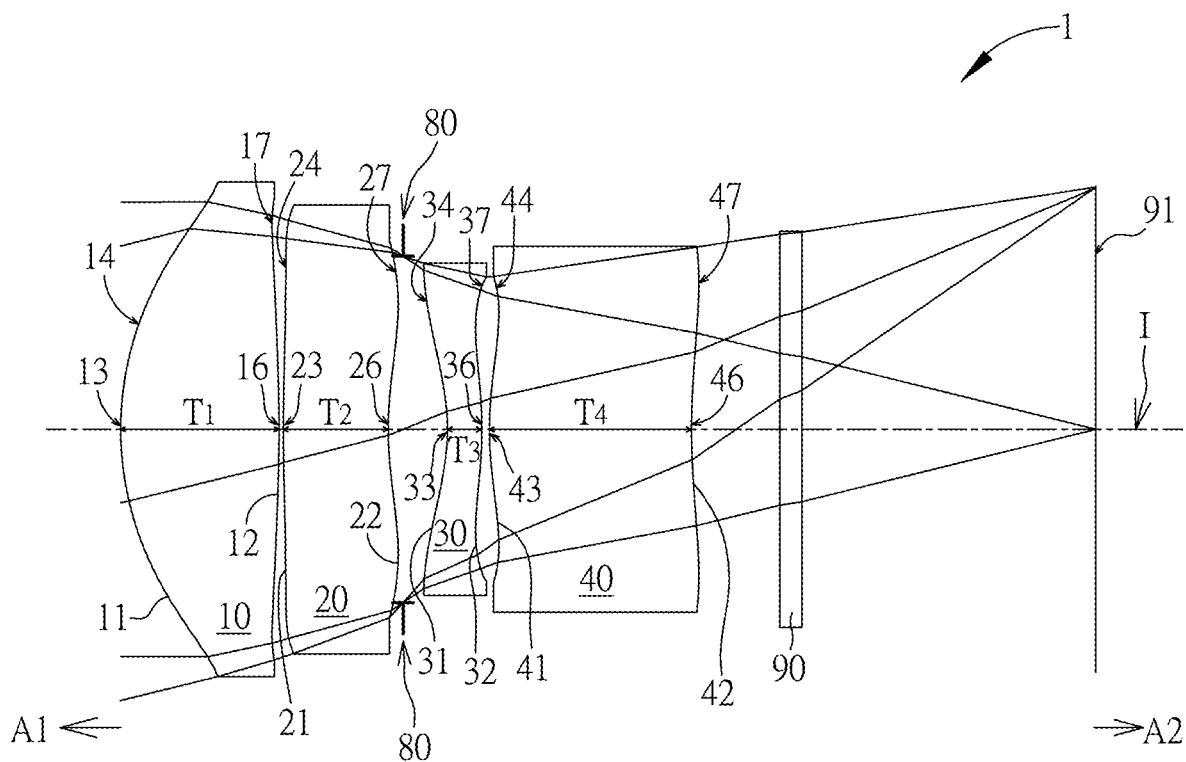
FIG. 6 illustrates a first embodiment of the optical imaging lens of the present invention.

As shown in FIG. 6, the optical imaging lens 1 of four lens elements of the present invention, sequentially located from an object side A1 (where an object is located) to an image side A2 along an optical axis I, has a first lens element 10, a second lens element 20, an aperture stop 80, a third lens element 30, a fourth lens element 40 and an image plane 91. Generally speaking, the first lens element 10, the second lens element 20, the third lens element 30 and the fourth lens element 40 may be made of a transparent plastic material but the present invention is not limited to this, and each lens element has an appropriate refracting power. In the present invention, lens elements having refracting power included by the optical imaging lens 1 are only the four lens elements (the first lens element 10, the second lens element 20, the third lens element 30, the fourth lens element 40) described above. The optical axis I is the optical axis of the entire optical imaging lens 1, and the optical axis of each of the lens elements coincides with the optical axis of the optical imaging lens 1.

Furthermore, the optical imaging lens 1 includes an aperture stop (ape. stop) 80 disposed in an appropriate position. In FIG. 6, the aperture stop 80 is disposed between the second lens element 20 and the third lens element 30. When light emitted or reflected by an object (not shown) which is located at the object side A1 enters the optical imaging lens 1 of the present invention, it forms a clear and sharp image on the image plane 91 at the image side A2 after passing through the first lens element 10, the second lens element 20, the aperture stop 80, the third lens element 30, the fourth lens element 40 and the filter 90. In one embodiment of the present invention, the filter 90 may be a filter of various suitable functions to filter out light of a specific wavelength and placed between the fourth lens element 40 and the image plane 91. For example, the filter 90 may be an infrared light filter.

The first lens element 10, the second lens element 20, the third lens element 30 and the fourth lens element 40 of the optical imaging lens 1 each has an object-side surface 11, 21, 31 and 41 facing toward the object side A1 and allowing imaging rays to pass through as well as an image-side surface 12, 22, 32 and 42 facing toward the image side A2 and allowing the imaging rays to pass through. Furthermore, each object-side surface and image-side surface of lens elements in the optical imaging lens of present invention has an optical axis region and a periphery region.

Each lens element in the optical imaging lens 1 of the present invention further has a thickness T along the optical axis I. For embodiment, the first lens element 10 has a first lens element thickness T1, the second lens element 20 has a second lens element thickness T2, the third lens element 30 has a third lens element thickness T3 and the fourth lens element 40 has a fourth lens element thickness T4. Therefore, a sum of thicknesses of all the four lens elements in the optical imaging lens 1 along the optical axis I is ALT=T1+T2+T3+T4.

In addition, between two adjacent lens elements in the optical imaging lens 1 of the present invention there may be an air gap along the optical axis I. In embodiments, there is an air gap G12 between the first lens element 10 and the second lens element 20, an air gap G23 between the second lens element 20 and the third lens element 30, and an air gap G34 between the third lens element 30 and the fourth lens element 40. Therefore, a sum of three air gaps from the first lens element 10 to the fourth lens element 40 along the optical axis I is AAG=G12+G23+G34.

In addition, a distance from the object-side surface 11 of the first lens element 10 to the image plane 91 along the optical axis I is TTL, namely a system length of the optical imaging lens 1; an effective focal length of the optical imaging lens is EFL; a distance from the object-side surface 11 of the first lens element 10 to the image-side surface 42 of the fourth lens element 40 along the optical axis I is TL.

An air gap between the image-side surface 42 of the fourth lens element 40 and the filter 90 along the optical axis I is G4F when the filter 90 is placed between the fourth lens element 40 and the image plane 91; a thickness of the filter 90 along the optical axis I is TF; an air gap between the filter 90 and the image plane 91 along the optical axis I is GFP; and a distance from the image-side surface 42 of the fourth lens element 40 to the image plane 91 along the optical axis I, namely the back focal length is BFL. Therefore, BFL=G4F+TF+GFP. ImgH is an image height of the optical imaging lens 1.

Furthermore, a focal length of the first lens element 10 is f1; a focal length of the second lens element 20 is f2; a focal length of the third lens element 30 is f3; a focal length of the fourth lens element 40 is f4; a refractive index of the first lens element 10 is n1; a refractive index of the second lens element 20 is n2; a refractive index of the third lens element 30 is n3; a refractive index of the fourth lens element 40 is n4; an Abbe number of the first lens element 10 is υ1; an Abbe number of the second lens element 20 is υ2; an Abbe number of the third lens element 30 is υ3; and an Abbe number of the fourth lens element 40 is υ4. An effective radius of the object-side surface 11 of the first lens element 10 is r1; an effective radius of the image-side surface 12 of the first lens element 10 is r2; an effective radius of the object-side surface 21 of the second lens element 20 is r3; an effective radius of the image-side surface 22 of the second lens element 20 is r4; an effective radius of the object-side surface 31 of the third lens element 30 is r5; an effective radius of the image-side surface 32 of the third lens element 30 is r6; an effective radius of the object-side surface 41 of the fourth lens element 40 is r7; an effective radius of the image-side surface 42 of the fourth lens element 40 is r8.

First Embodiment

Please refer to FIG. 6 which illustrates the first embodiment of the optical imaging lens 1 of the present invention.

Figures 7A, 7B, 7C, 7D:
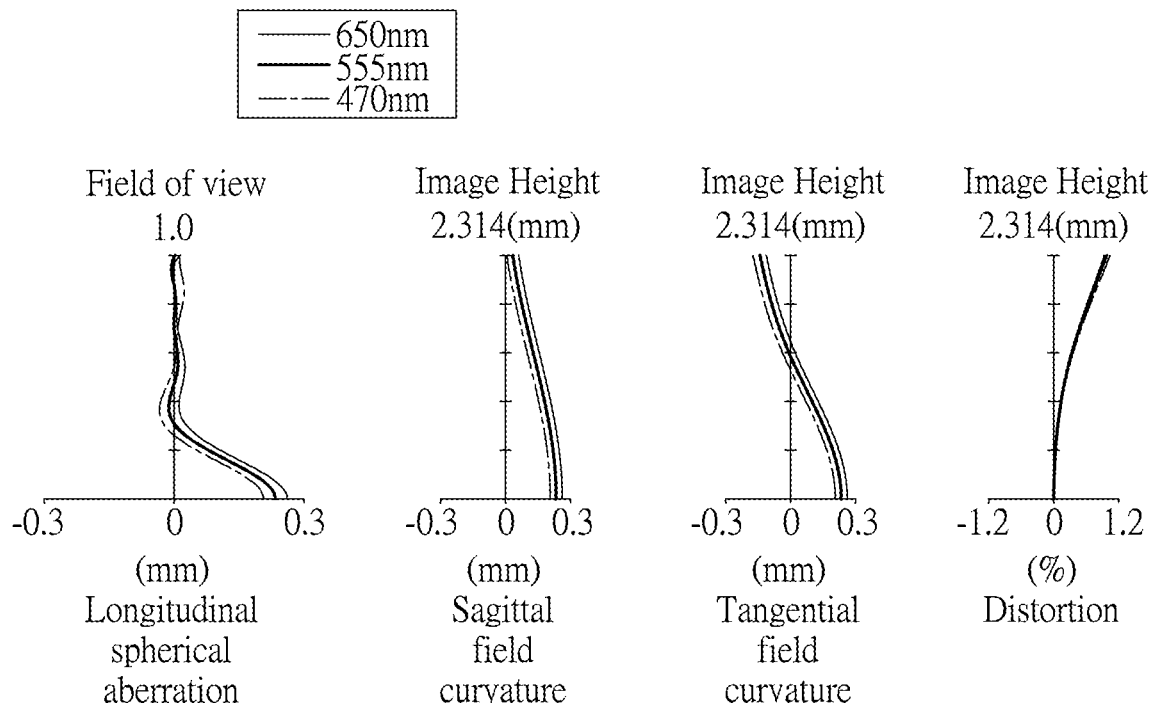
FIG. 7A illustrates the longitudinal spherical aberration on the image plane of the first embodiment.
FIG. 7B illustrates the field curvature aberration on the sagittal direction of the first embodiment.
FIG. 7C illustrates the field curvature aberration on the tangential direction of the first embodiment.
FIG. 7D illustrates the distortion aberration of the first embodiment.

Please refer to FIG. 7A for the longitudinal spherical aberration on the image plane 91 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion aberration in each embodiment stands for the "image height" (ImgH). ImgH of the first embodiment is 2.314 mm.

The optical imaging lens 1 of the first embodiment is mainly composed of four lens elements 10, 20, 30 and 40 with refracting power, an aperture stop 80, and an image plane 91. Only the four lens elements 10, 20, 30 and 40 of the optical imaging lens 1 of the first embodiment have refracting power. The aperture stop 80 is disposed between the second lens element 20 and the third lens element 30.

The first lens element 10 has positive refracting power. An optical axis region 13 of the object-side surface 11 of the first lens element 10 is convex and a periphery region 14 of the object-side surface 11 of the first lens element 10 is convex. An optical axis region 16 of the image-side surface 12 of the first lens element 10 is convex and a periphery region 17 of the image-side surface 12 of the first lens element 10 is concave. Besides, both the object-side surface 11 and the image-side surface 12 of the first lens element 10 are aspherical surfaces, but it is not limited thereto.

The second lens element 20 has negative refracting power. An optical axis region 23 of the object-side surface 21 of the second lens element 20 is convex and a periphery region 24 of the object-side surface 21 of the second lens element 20 is convex. An optical axis region 26 of the image-side surface 22 of the second lens element 20 is concave and a periphery region 27 of the image-side surface 22 of the second lens element 20 is convex. Besides, both the object-side surface 21 and the image-side surface 22 of the second lens element 20 are aspherical surfaces, but it is not limited thereto.

The third lens element 30 has negative refracting power. An optical axis region 33 of the object-side surface 31 of the third lens element 30 is concave and a periphery region 34 of the object-side surface 31 of the third lens element 30 is concave. An optical axis region 36 of the image-side surface 32 of the third lens element 30 is convex and a periphery region 37 of the image-side surface 32 of the third lens element 30 is concave. Besides, both the object-side surface 31 and the image-side surface 32 of the third lens element 30 are aspherical surfaces, but it is not limited thereto.

The fourth lens element 40 has positive refracting power. An optical axis region 43 of the object-side surface 41 of the fourth lens element 40 is convex and a periphery region 44 of the object-side surface 41 of the fourth lens element 40 is concave. An optical axis region 46 of the image-side surface 42 of the fourth lens element 40 is concave and a periphery region 47 of the image-side surface 42 of the fourth lens element 40 is convex. Besides, both the object-side surface 41 and the image-side surface 42 of the fourth lens element 40 are aspherical surfaces, but it is not limited thereto.

In the first lens element 10, the second lens element 20, the third lens element 30, the fourth lens element 40 of the optical imaging lens element 1 of the present invention, there are 8 surfaces, such as the object-side surfaces 11/21/31/41 and the image-side surfaces 12/22/32/42 are aspherical, but it is not limited thereto. If a surface is aspherical, these aspheric coefficients are defined according to the following formula:

$$Z(Y) = \frac{Y^2}{R} / \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis I and the tangent plane of the vertex on the optical axis I of the aspherical surface);
Y represents a vertical distance from a point on the aspherical surface to the optical axis I;
K is a conic constant; and
$a_i$ is the aspheric coefficient of the $i^{th}$ order.

The optical data of the first embodiment of the optical imaging lens 1 are shown in FIG. 22 while the aspheric surface data are shown in FIG. 23. In the present embodiments of the optical imaging lens, the f-number of the entire optical imaging lens is Fno (a smaller Fno represents a larger aperture stop), EFL is the effective focal length, HFOV stands for the half field of view of the entire optical imaging lens (a smaller HFOV represents a larger optical zoom), and the unit for the radius, the thickness and the focal length is in millimeters (mm). In this embodiment, TTL=9.335 mm; EFL=9.333 mm; HFOV=14.000 degrees; ImgH=2.314 mm; Fno=1.800.

Second Embodiment

Figure 8:
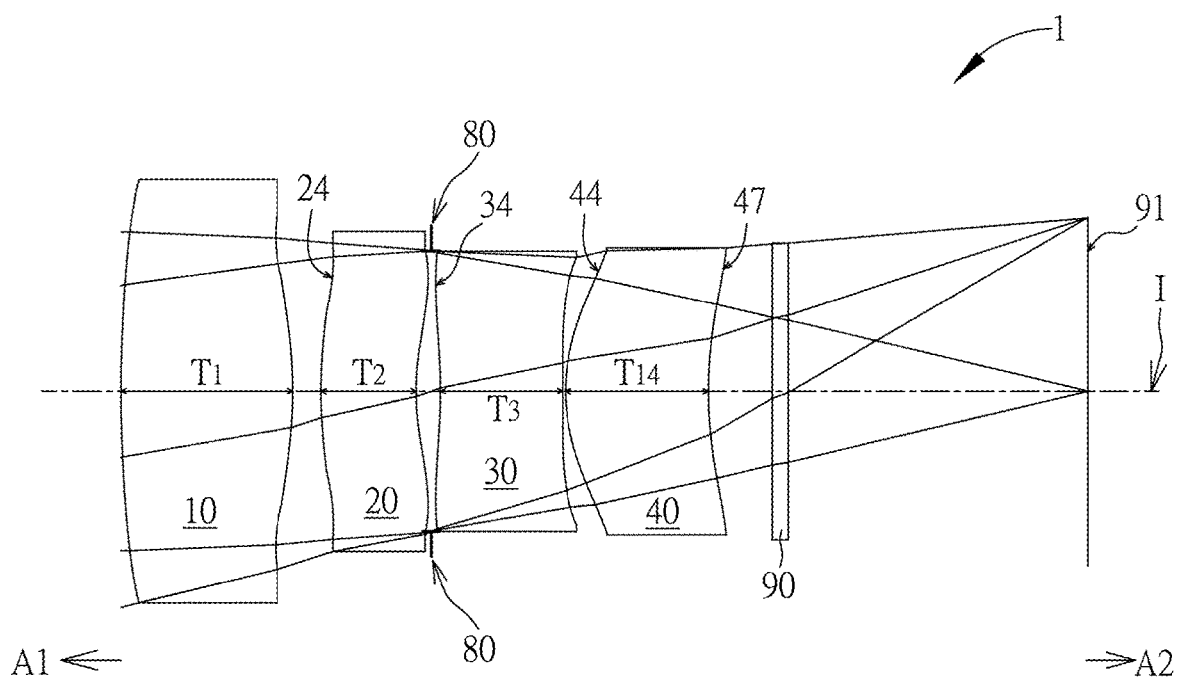
FIG. 8 illustrates a second embodiment of the optical imaging lens of the present invention.
Figures 9A, 9B, 9C, 9D:
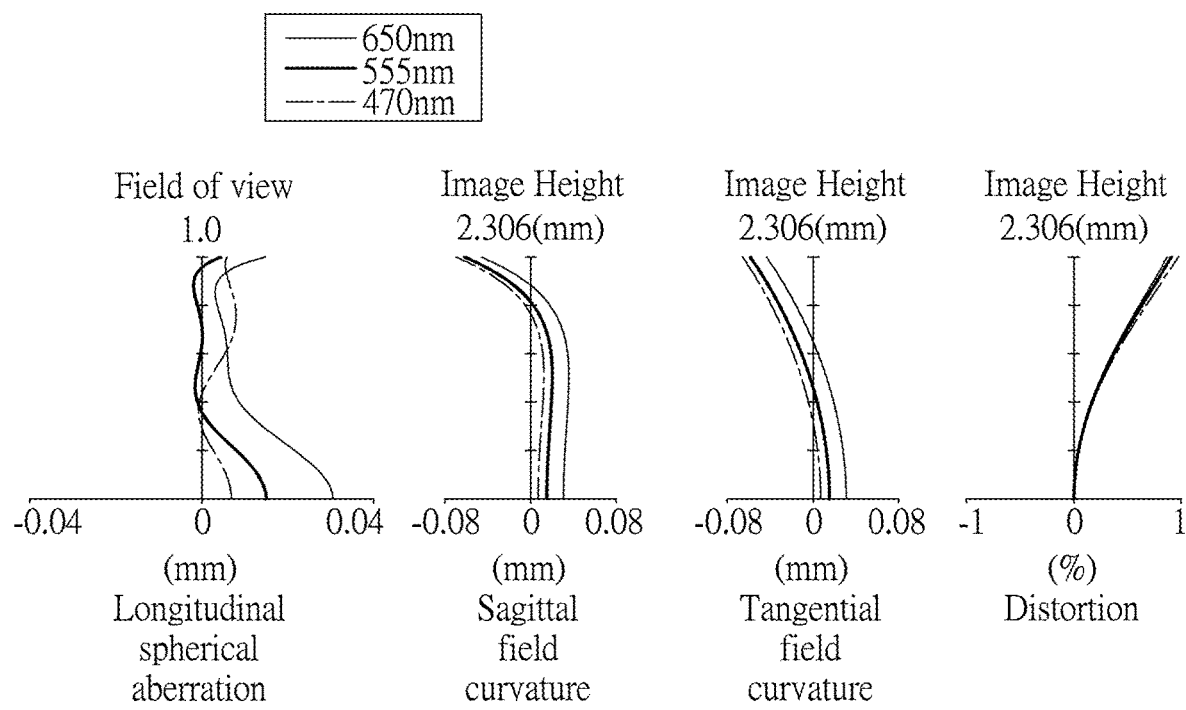
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion aberration of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as a convex surface or a concave surface, are omitted in the following embodiments. Please refer to FIG. 9A for the longitudinal spherical aberration on the image plane 91 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 24 of the object-side surface 21 of the second lens element 20 is concave, a periphery region 34 of the object-side surface 31 of the third lens element 30 is convex, a periphery region 44 of the object-side surface 41 of the fourth lens element 40 is convex, and a periphery region 47 of the image-side surface 42 of the fourth lens element 40 is concave.

The optical data of the second embodiment of the optical imaging lens are shown in FIG. 24 while the aspheric surface data are shown in FIG. 25. In this embodiment, TTL=12.801 mm; EFL=9.009 mm; HFOV=13.997 degrees; ImgH=2.306 mm; Fno=1.800. In particular, 1) the longitudinal spherical aberration of the optical imaging lens in this embodiment is better than that of the optical imaging lens in the first embodiment, 2) the field curvature aberration on the sagittal direction of the optical imaging lens in this embodiment is better than that of the optical imaging lens in the first embodiment, 3) the field curvature aberration on the tangential direction of the optical imaging lens in this embodiment is better than that of the optical imaging lens in the first embodiment, 4) the distortion aberration in this embodiment is better than that of the optical imaging lens in the first embodiment, 5) the HFOV of the optical imaging lens in this embodiment is smaller than that of the optical imaging lens in the first embodiment so the zoom-in rate in this embodiment is larger than that of the optical imaging lens in the first embodiment, and 6) the thickness difference in this embodiment between the periphery region and the optical axis region is smaller than that of the optical imaging lens in the first embodiment so it is easier to fabricate to result in a better fabrication yield.

Third Embodiment

Figure 10:
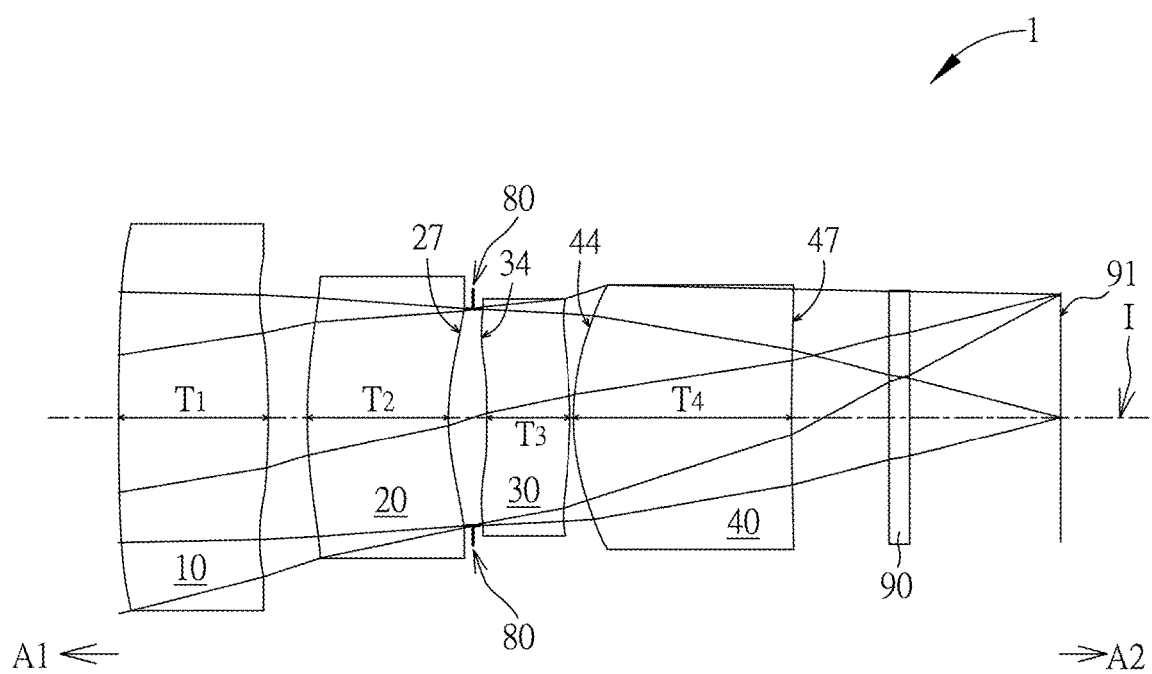
FIG. 10 illustrates a third embodiment of the optical imaging lens of the present invention.
Figures 11A, 11B, 11C, 11D:
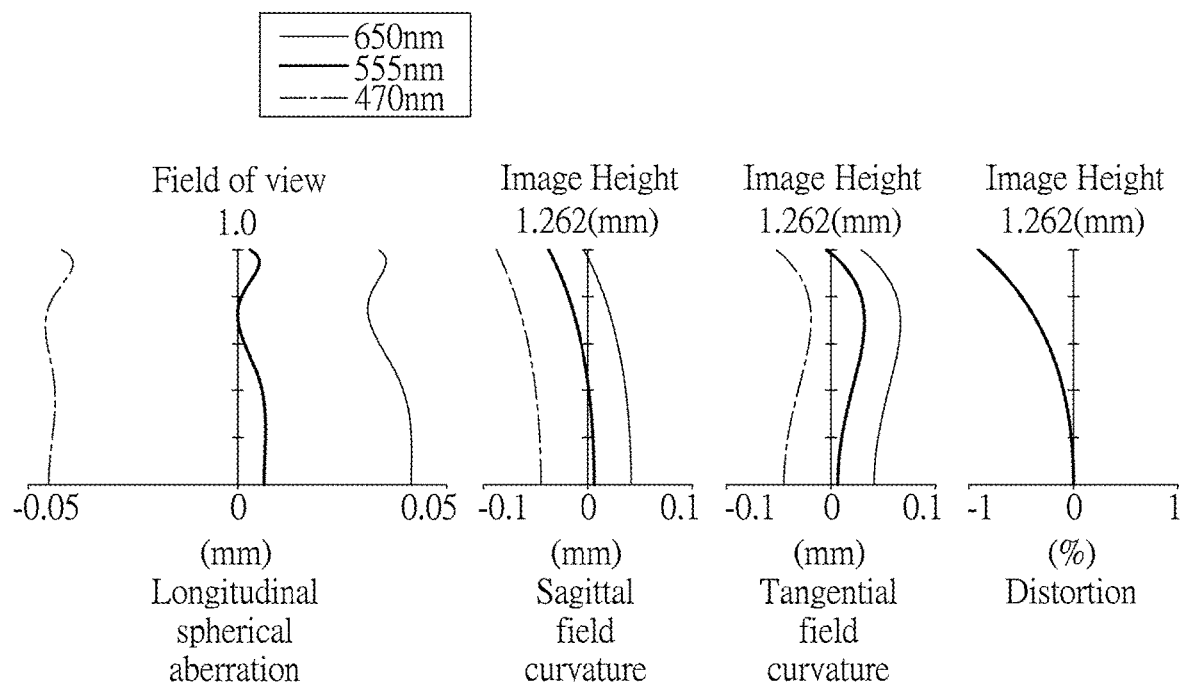
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion aberration of the third embodiment.

Please refer to FIG. 10 which illustrates the third embodiment of the optical imaging lens 1 of the present invention. Please refer to FIG. 11A for the longitudinal spherical aberration on the image plane 91 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 27 of the image-side surface 22 of the second lens element 20 is concave, the third lens element 30 has positive refracting power, a periphery region 34 of the object-side surface 31 of the third lens element 30 is convex, a periphery region 44 of the object-side surface 41 of the fourth lens element 40 is convex, and a periphery region 47 of the image-side surface 42 of the fourth lens element 40 is concave.

The optical data of the third embodiment of the optical imaging lens are shown in FIG. 26 while the aspheric surface data are shown in FIG. 27. In this embodiment, TTL=9.616 mm; EFL=5.071 mm; HFOV=13.996 degrees; ImgH=1.262 mm; Fno=1.800. In particular, 1) the longitudinal spherical aberration of the optical imaging lens in this embodiment is better than that of the optical imaging lens in the first embodiment, 2) the field curvature aberration on the sagittal direction of the optical imaging lens in this embodiment is better than that of the optical imaging lens in the first embodiment, 3) the field curvature aberration on the tangential direction of the optical imaging lens in this embodiment is better than that of the optical imaging lens in the first embodiment, 4) the distortion aberration in this embodiment is better than that of the optical imaging lens in the first embodiment, 5) the HFOV of the optical imaging lens in this embodiment is smaller than that of the optical imaging lens in the first embodiment so the zoom-in rate in this embodiment is larger than that of the optical imaging lens in the first embodiment, and 6) the thickness difference in this embodiment between the periphery region and the optical axis region is smaller than that of the optical imaging lens in the first embodiment so it is easier to fabricate to result in a better fabrication yield.

Fourth Embodiment

Figure 12:
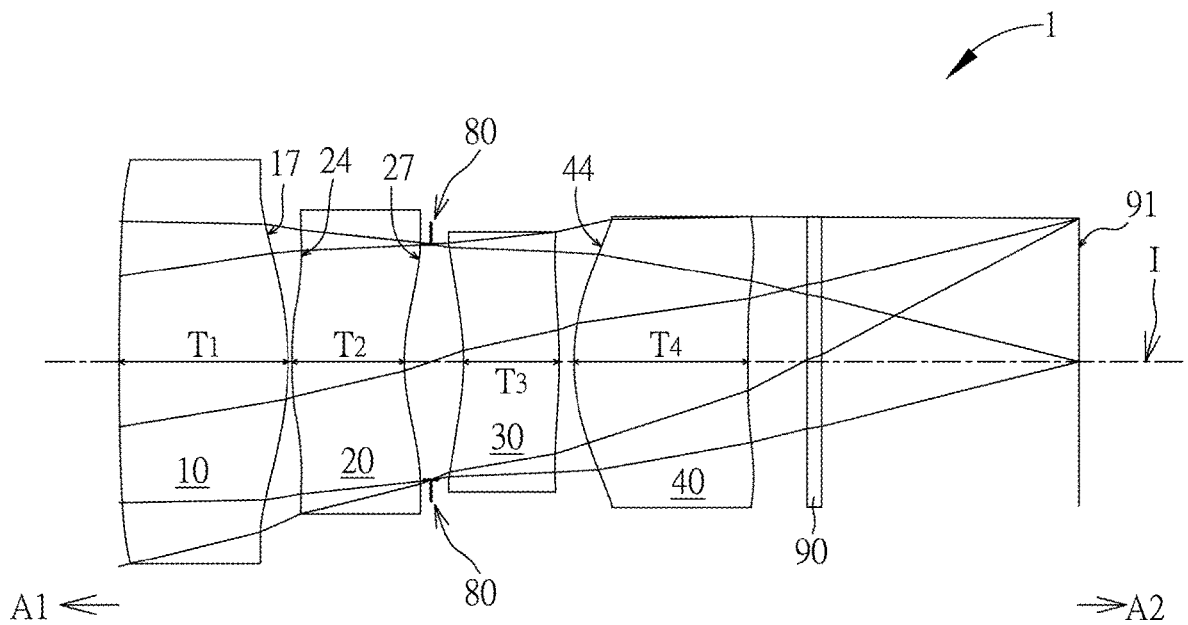
FIG. 12 illustrates a fourth embodiment of the optical imaging lens of the present invention.
Figures 13A, 13B, 13C, 13D:
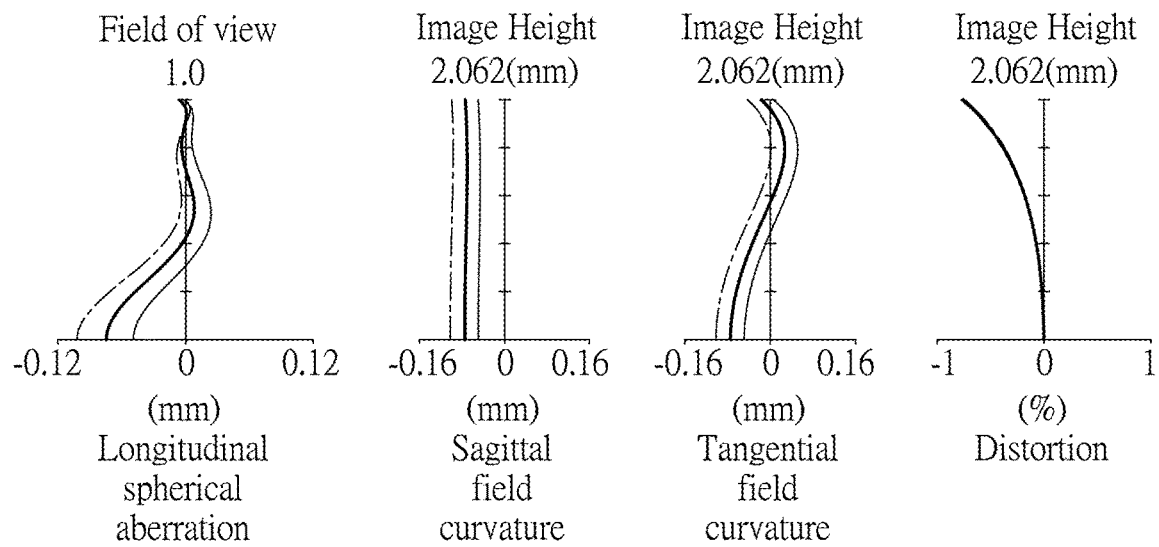
FIG. 13A illustrates the longitudinal spherical aberration on the image plane of the fourth embodiment.
FIG. 13B illustrates the field curvature aberration on the sagittal direction of the fourth embodiment.
FIG. 13C illustrates the field curvature aberration on the tangential direction of the fourth embodiment.
FIG. 13D illustrates the distortion aberration of the fourth embodiment.

Please refer to FIG. 12 which illustrates the fourth embodiment of the optical imaging lens 1 of the present invention. Please refer to FIG. 13A for the longitudinal spherical aberration on the image plane 91 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 17 of the image-side surface 12 of the first lens element 10 is convex, a periphery region 24 of the object-side surface 21 of the second lens element 20 is concave, a periphery region 27 of the image-side surface 22 of the second lens element 20 is concave, a periphery region 44 of the object-side surface 41 of the fourth lens element 40 is convex.

The optical data of the fourth embodiment of the optical imaging lens are shown in FIG. 28 while the aspheric surface data are shown in FIG. 29. In this embodiment, TTL=13.796 mm; EFL=8.147 mm; HFOV=13.996 degrees; ImgH=2.062 mm; Fno=1.800. In particular, 1) the longitudinal spherical aberration of the optical imaging lens in this embodiment is better than that of the optical imaging lens in the first embodiment, 2) the field curvature aberration on the sagittal direction of the optical imaging lens in this embodiment is better than that of the optical imaging lens in the first embodiment, 3) the field curvature aberration on the tangential direction of the optical imaging lens in this embodiment is better than that of the optical imaging lens in the first embodiment, 4) the distortion aberration in this embodiment is better than that of the optical imaging lens in the first embodiment, 5) the HFOV of the optical imaging lens in this embodiment is smaller than that of the optical imaging lens in the first embodiment so the zoom-in rate in this embodiment is larger than that of the optical imaging lens in the first embodiment, and 6) the thickness difference in this embodiment between the periphery region and the optical axis region is smaller than that of the optical imaging lens in the first embodiment so it is easier to fabricate to result in a better fabrication yield.

Fifth Embodiment

Please refer to FIG. 14 which illustrates the fifth embodiment of the optical imaging lens 1 of the present invention. Please refer to FIG. 15A for the longitudinal spherical aberration on the image plane 91 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 27 of the image-side surface 22 of the second lens element 20 is concave, and a periphery region 44 of the object-side surface 41 of the fourth lens element 40 is convex.

The optical data of the fifth embodiment of the optical imaging lens are shown in FIG. 30 while the aspheric surface data are shown in FIG. 31. In this embodiment, TTL=13.306 mm; EFL=9.371 mm; HFOV=13.998 degrees; ImgH=2.358 mm; Fno=1.800. In particular, 1) the longitudinal spherical aberration of the optical imaging lens in this embodiment is better than that of the optical imaging lens in the first embodiment, 2) the distortion aberration in this embodiment is better than that of the optical imaging lens in the first embodiment, and 3) the HFOV of the optical imaging lens in this embodiment is smaller than that of the optical imaging lens in the first embodiment and EFL is larger than that of the optical imaging lens in the first embodiment so the zoom-in rate in this embodiment is larger than that of the optical imaging lens in the first embodiment.

Sixth Embodiment

Please refer to FIG. 16 which illustrates the sixth embodiment of the optical imaging lens 1 of the present invention. Please refer to FIG. 17A for the longitudinal spherical aberration on the image plane 91 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 44 of the object-side surface 41 of the fourth lens element 40 is convex, and a periphery region 47 of the image-side surface 42 of the fourth lens element 40 is concave.

The optical data of the sixth embodiment of the optical imaging lens are shown in FIG. 32 while the aspheric surface data are shown in FIG. 33. In this embodiment, TTL=14.410 mm; EFL=9.742 mm; HFOV=13.996 degrees; ImgH=2.453 mm; Fno=1.800. In particular, 1) the longitudinal spherical aberration of the optical imaging lens in this embodiment is better than that of the optical imaging lens in the first embodiment, 2) the field curvature aberration on the sagittal direction of the optical imaging lens in this embodiment is better than that of the optical imaging lens in the first embodiment, 3) the field curvature aberration on the tangential direction of the optical imaging lens in this embodiment is better than that of the optical imaging lens in the first embodiment, 4) the distortion aberration in this embodiment is better than that of the optical imaging lens in the first embodiment, 5) the HFOV of the optical imaging lens in this embodiment is smaller than that of the optical imaging lens in the first embodiment and EFL is larger than that of the optical imaging lens in the first embodiment so the zoom-in rate in this embodiment is larger than that of the optical imaging lens in the first embodiment, and 6) the thickness difference in this embodiment between the periphery region and the optical axis region is smaller than that of the optical imaging lens in the first embodiment so it is easier to fabricate to result in a better fabrication yield.

Seventh Embodiment

Please refer to FIG. 18 which illustrates the seventh embodiment of the optical imaging lens 1 of the present invention. Please refer to FIG. 19A for the longitudinal spherical aberration on the image plane 91 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 17 of the image-side surface 12 of the first lens element 10 is convex, and the fourth lens element 40 has negative refracting power.

The optical data of the seventh embodiment of the optical imaging lens are shown in FIG. 34 while the aspheric surface data are shown in FIG. 35. In this embodiment, TTL=12.579 mm; EFL=10.070 mm; HFOV=14.000 degrees; ImgH=2.564 mm; Fno=1.800. In particular, 1) the longitudinal spherical aberration of the optical imaging lens in this embodiment is better than that of the optical imaging lens in the first embodiment, 2) the distortion aberration in this embodiment is better than that of the optical imaging lens in the first embodiment, 3) EFL of the optical imaging lens in this embodiment is larger than that of the optical imaging lens in the first embodiment so the zoom-in rate in this embodiment is larger than that of the optical imaging lens in the first embodiment, and 4) the thickness difference in this embodiment between the periphery region and the optical axis region is smaller than that of the optical imaging lens in the first embodiment so it is easier to fabricate to result in a better fabrication yield.

Eighth Embodiment

Figure 20:
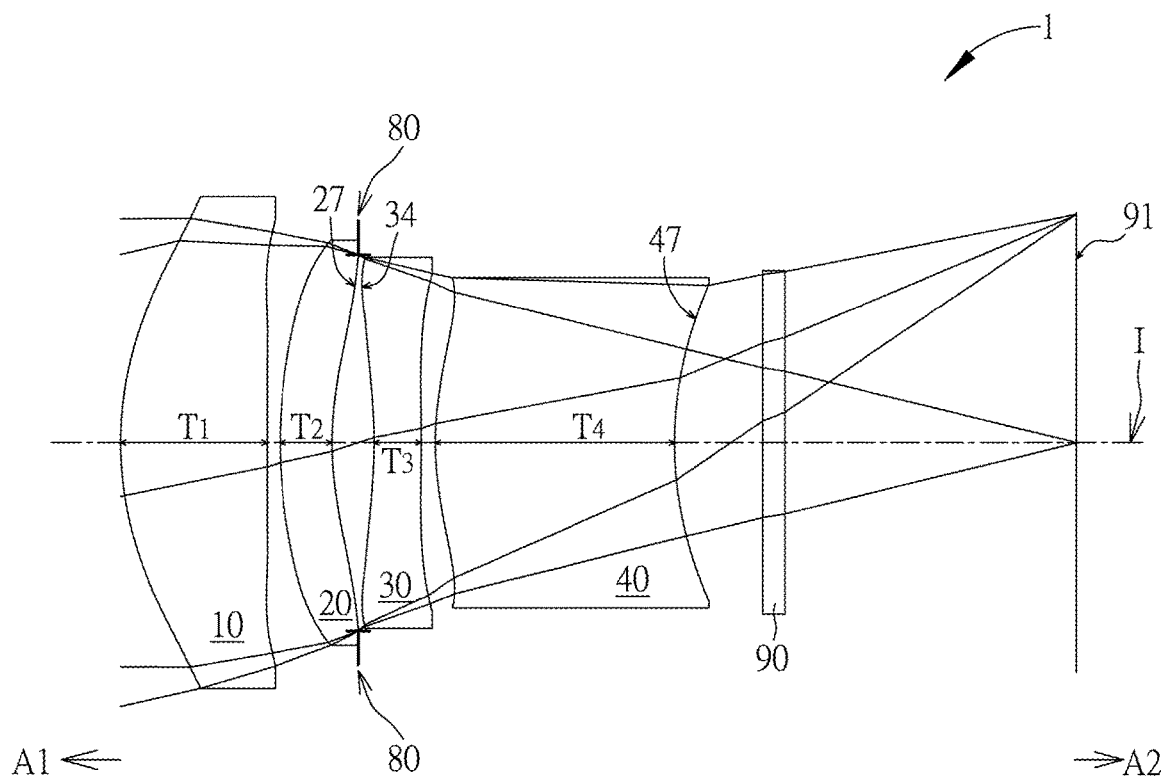
FIG. 20 illustrates an eighth embodiment of the optical imaging lens of the present invention.
Figures 21A, 21B, 21C, 21D:
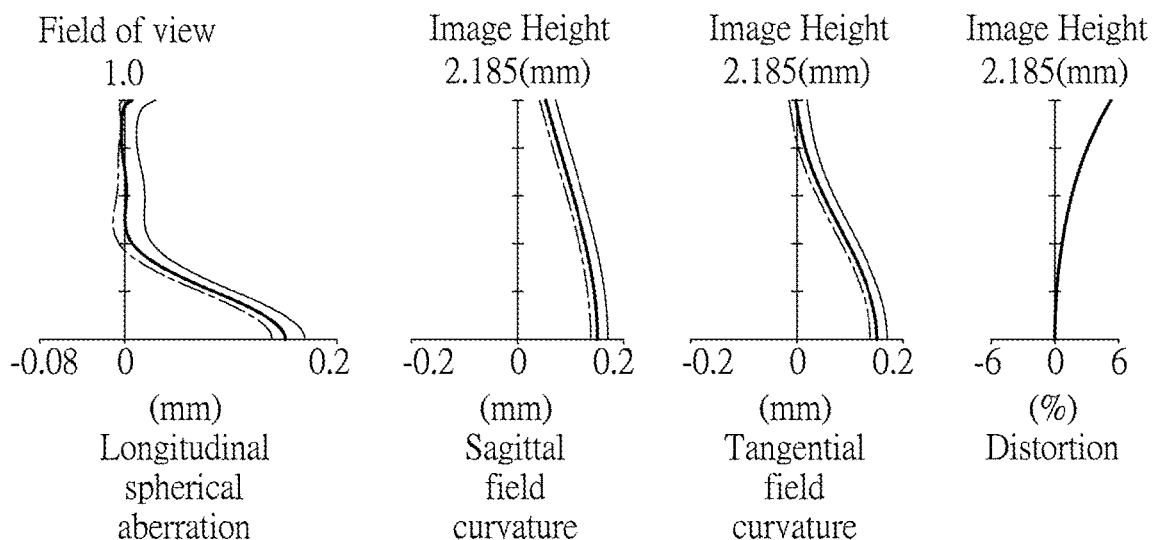
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion aberration of the eighth embodiment.

Please refer to FIG. 20 which illustrates the eighth embodiment of the optical imaging lens 1 of the present invention. Please refer to FIG. 21A for the longitudinal spherical aberration on the image plane 91 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the refracting power, the radius, the lens thickness, the aspheric surface or the back focal length in this embodiment are different from the optical data in the first embodiment. Besides, in this embodiment, a periphery region 27 of the image-side surface 22 of the second lens element 20 is concave, a periphery region 34 of the object-side surface 31 of the third lens element 30 is convex, and a periphery region 47 of the image-side surface 42 of the fourth lens element 40 is concave.

The optical data of the eighth embodiment of the optical imaging lens are shown in FIG. 36 while the aspheric surface data are shown in FIG. 37. In this embodiment, TTL=9.150 mm; EFL=9.149 mm; HFOV=12.802 degrees; ImgH=2.185 mm; Fno=1.800. In particular, 1) TTL of the optical imaging lens in this embodiment is shorter than that of the optical imaging lens in the first embodiment, 2) the longitudinal spherical aberration of the optical imaging lens in this embodiment is better than that of the optical imaging lens in the first embodiment, 3) the field curvature aberration on the sagittal direction of the optical imaging lens in this embodiment is better than that of the optical imaging lens in the first embodiment, 4) the field curvature aberration on the tangential direction of the optical imaging lens in this embodiment is better than that of the optical imaging lens in the first embodiment, 5) the HFOV of the optical imaging lens in this embodiment is smaller than that of the optical imaging lens in the first embodiment so the zoom-in rate in this embodiment is larger than that of the optical imaging lens in the first embodiment.

Some important ratios in each embodiment are shown in FIG. 38 and in FIG. 39.

The optical axis region of the image-side surface of the fourth lens element may be concave to further go with one of the following curvatures or conditional formulas in (a)~(c), it is beneficiary to increase the EFL and to simultaneously lower the F number to keep the imaging quality:

(a) an optical axis region of the image-side surface of the first lens element is convex, the aperture stop is disposed between the second lens element and the third lens element, and HFOV/TTL≤1.500°/mm;

(b) the first lens element has positive refracting power, the aperture stop is disposed between the second lens element and the third lens element, and HFOV≤15.000°;

(c) an optical axis region of the image-side surface of the first lens element is convex, the second lens element has negative refracting power, an optical axis region of the object-side surface of the third lens element is concave, a periphery region of the image-side surface of the third lens element is concave, and HFOV/TTL≤1.500°/mm.

In addition, the first lens element has positive refracting power, an optical axis region of the image-side surface of the third lens element is convex, an optical axis region of the image-side surface of the fourth lens element is concave, the aperture stop is disposed between the second lens element and the third lens element to further go with one of the following limitations, such as: an optical axis region of the image-side surface of the first lens element is convex, the third lens element has negative refracting power or a periphery region of the image-side surface of the third lens element is concave, to facilitate the decrease of the distortion aberration;

the aperture stop is disposed between the second lens element and the third lens element, HFOV≤15.000°, to further go with one of the following limitations, such as: the third lens element has negative refracting power, an optical axis region of the object-side surface of the third lens element is concave or the fourth lens element has positive refracting power to facilitate to keep the imaging quality;

and the first lens element has positive refracting power, the aperture stop is disposed between the second lens element and the third lens element, HFOV≤15.000°, to further go with one of the following limitations, such as: an optical axis region of the object-side surface of the second lens element is convex, a periphery region of the object-side surface of the second lens element is convex, an optical axis region of the object-side surface of the fourth lens element is convex, a periphery region of the object-side surface of the fourth lens element is convex or an optical axis region of the image-side surface of the fourth lens element is concave to facilitate to decrease the field curvature aberration;

an optical axis region of the image-side surface of the first lens element is convex, an optical axis region of the object-side surface of the third lens element is concave, a periphery region of the image-side surface of the third lens element is concave, HFOV≤15.000°, to further go with one of the following limitations, such as: an optical axis region of the image-side surface of the third lens element is convex, an optical axis region of the image-side surface of the fourth lens element is concave, or a periphery region of the image-side surface of the fourth lens element is concave to facilitate to decrease the longitudinal spherical aberration;

the second lens element has negative refracting power, the third lens element has negative refracting power, an optical axis region of the image-side surface of the third lens element is convex, a periphery region of the image-side surface of the third lens element is concave, a periphery region of the image-side surface of the fourth lens element is concave to facilitate to decrease the distortion aberration;

and an optical axis region of the image-side surface of the first lens element is convex, the second lens element has negative refracting power, an optical axis region of the object-side surface of the third lens element is concave, a periphery region of the image-side surface of the third lens element is concave, a periphery region of the image-side surface of the fourth lens element is concave, to further go with one of the following limitations, such as: an optical axis region of the object-side surface of the second lens element is convex, a periphery region of the object-side surface of the second lens element is convex, or the third lens element has negative refracting power. It may have similar efficacy.

2. When the optical imaging lens of the present invention further satisfies at least one of the following conditional formulas, it may keep the thickness of each lens element and the air gaps between the adjacent lens elements having a suitable value so that an overly great value may be avoided not to jeopardize the shrinkage of the optical imaging lens of the present invention:

a) The air gaps between the adjacent lens elements should be decreased or the thickness of each lens element should be appropriately reduced to keep the imaging quality, to facilitate the assembly and to increase the fabrication yield. However, the assembly or the manufacturing difficulty or the imaging quality should be taken into consideration as well to balance the air gaps and the thickness. If the following numerical conditions are selectively satisfied, the optical imaging lens of the present invention may have better optical arrangements:

HFOV/TTL≤1.500°/mm, and the preferable range is 0.850~1.500.

TTL/AAG≥10.000, and the preferable range is 10.000~19.100, and when the range is 10.000~19.100, the distortion aberration and the field curvature aberration may be significantly improved, and when the range is 10.000~17.800, the longitudinal spherical aberration may be significantly improved, and when the range is 12.500~19.100, the longitudinal spherical aberration may be significantly improved, too.

(T1+G12+T2)/AAG≥3.000, and the preferable range is 3.000~5.850, and when the range is 3.000~5.850, the distortion aberration and the field curvature aberration may be significantly improved, and when the range is 3.000~4.500, the longitudinal spherical aberration may be significantly improved.

(T2+T4)/(T1+T3)≥0.750, and the preferable range is 0.750~2.400.

T4/(G12+G23)≥1.500, and the preferable range is 1.500~6.800, and when the range is 1.500~6.800, the distortion aberration and the field curvature aberration may be significantly improved, and when the range is 2.500~6.800, the longitudinal spherical aberration may be significantly improved.

TL/AAG≥7.000, and the preferable range is 7.000~12.500.

T4/(T1+AAG)≥0.350, and the preferable range is 0.350~2.200, and when the range is 0.350~2.200, the distortion aberration and the field curvature aberration may be significantly improved, and when the range is 0.800~2.200, the longitudinal spherical aberration may be significantly improved.

Fno*TTL/ALT≤5.000, and the preferable range is 2.500~5.000, and when the range is 2.500~4.000, the distortion aberration and the field curvature aberration may be significantly improved, and when the range is 2.500~5.000, the longitudinal spherical aberration may be significantly improved.

ALT/AAG≥6.900, and the preferable range is 6.900~11.400. (T4+BFL)/T1≥3.000, and the preferable range is 3.000~6.200. (T2+T4)/(G12+G23)≥4.500, and the preferable range is 4.500~9.000.

(G34+TL)/(T1+T3)≤3.500, and the preferable range is 1.800~3.500, and when the range is 1.800~3.500, the distortion aberration and the field curvature aberration may be significantly improved, and when the range is 2.600~3.500, the longitudinal spherical aberration may be significantly improved.

ALT/(T1+G34)≥3.000, and the preferable range is 3.000~5.900.

TTL/(T2+G23+T3)≥3.500, and the preferable range is 3.500~7.450.

TL/(G12+T2+G23)≥3.000, and the preferable range is 3.000~5.700, and when the range is 3.000~4.900, the distortion aberration and the field curvature aberration may be significantly improved, and when the range is 3.000~5.700, the longitudinal spherical aberration may be significantly improved.

BFL/(T3+G34)≥3.000, and the preferable range is 3.000~10.600, and when the range is 3.000~10.600, the distortion aberration and the field curvature aberration may be significantly improved, and when the range is 3.000~7.000, the longitudinal spherical aberration may be significantly improved, and when the range is 3.000~4.000, the longitudinal spherical aberration may be significantly improved, too.

TTL/(T1+G12+T3)≥3.000, and the preferable range is 3.000~5.450.

TTL/BFL≤3.500, and the preferable range is 1.750~3.500.

(T1+T2)/(G12+T3+G34)≥1.500, and the preferable range is 1.500~6.300, and when the range is 1.500~6.300, the distortion aberration and the field curvature aberration may be significantly improved, and when the range is 1.500~3.000, the longitudinal spherical aberration may be significantly improved.

b) The adjustment of EFL helps improve the optical zoom rate. If the following conditional formulas are selectively satisfied, they are helpful to improve the optical zoom rate as well when the thickness of the optical system decreases.

HFOV/EFL≤3.000°/mm, and the preferable range is 1.250~3.000, and when the range is 1.250~3.000, the distortion aberration and the field curvature aberration may be significantly improved, and when the range is 1.250~1.900, the longitudinal spherical aberration may be significantly improved.

(T3+EFL)/BFL≥1.500, and the preferable range is 1.500~2.850, and when the range is 1.500~2.850, the distortion aberration and the field curvature aberration may be significantly improved, and when the range is 2.000~2.850, the longitudinal spherical aberration may be significantly improved.

(TTL+EFL)/ALT≤4.500, and the preferable range is 2.200~4.500.

Fno*EFL/BFL≤4.500, and the preferable range is 2.200~4.500, and when the range is 2.200~4.500, the distortion aberration and the field curvature aberration may be significantly improved, and when the range is 2.900~4.500, the longitudinal spherical aberration may be significantly improved.

EFL/TTL≤1.000, and the preferable range is 0.500~1.000. (EFL+T4)/(AAG+T1)≥3.000, and the preferable range is 3.000~6.400.

EFL/ALT≤2.500, and the preferable range is 0.750~2.500, and when the range is 0.750~2.500, the distortion aberration and the field curvature aberration may be significantly improved, and when the range is 0.900~2.500, the longitudinal spherical aberration may be significantly improved.

EFL/(T1+G12)≤6.000, and the preferable range is 2.350~6.000, and when the range is 2.350~6.000, the distortion aberration and the field curvature aberration may be significantly improved, and when the range is 2.900~6.000, the longitudinal spherical aberration may be significantly improved.

(EFL+BFL)/ALT≤2.800, and the preferable range is 1.150~2.800.

c) By adjusting the effective radius of les elements to go with the aperture stop provided between the second lens element and the third lens element, it helps to lower the F number, to reduce the size and to improve the aberration of the optical system. If the following conditional formulas are selectively satisfied, they may effectively improve the longitudinal spherical aberration, the field curvature aberration and the longitudinal spherical aberration.

r1/r6≥1.100, and the preferable range is 1.100~2.000;
r1/r8≥1.150, and the preferable range is 1.150~1.800;
r3/r6≥1.000, and the preferable range is 1.000~1.500;
r3/r8≥0.900, and the preferable range is 0.900~1.600;
(r1+r3)/r6≥2.200, and the preferable range is 2.200~3.300;
(r1+r3)/r8≥2.000, and the preferable range is 2.000~3.400.

d) If any one of the following conditional formulas is satisfied, it helps enhance the sharpness of partial imaging, and effectively correct the aberration of partial imaging of the object.

υ1+υ2≥2*υ3;
υ1+υ2≥2*υ4;
υ2+υ3≤2*υ4;
υ1+υ2+υ3≤3*υ4;
υ1+υ3+υ4≤3*υ2.

The optional combination of the parameters in the embodiments may be selected to add limitations to the optical imaging lens to facilitate the design of the les of the present invention of similar configuration.

In the light of the unpredictability of the optical imaging lens, the above conditional formulas preferably suggest the above principles to have a shorter total length of the optical imaging lens, a larger aperture available, better imaging quality or a better fabrication yield to overcome the drawbacks of prior art.

The numeral value ranges within the maximum and minimum values obtained from the combination ratio relationships of the optical parameters disclosed in each embodiment of the invention can all be implemented accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, an aperture stop, a third lens element, and a fourth lens element, each of the first lens element to the fourth lens element having an object-side surface facing toward the object side and allowing imaging rays to pass through as well as an image-side surface facing toward the image side and allowing the imaging rays to pass through, wherein:
- an optical axis region of the image-side surface of the first lens element is convex; and
- an optical axis of the image-side surface of the fourth lens element is concave;
- wherein only the above-mentioned four lens elements of the optical imaging lens have refracting power;
- wherein HFOV stands for a half field of view of the optical imaging lens and TTL is a distance from the object-side surface of the first lens element to an image plane along the optical axis, and the optical imaging lens satisfies the relationship: HFOV/TTL<1.500°/mm.

2. The optical imaging lens of claim 1, wherein EFL is an effective focal length of the optical imaging lens, and the optical imaging lens satisfies the relationship: EFL/TTL<1.000.

3. The optical imaging lens of claim 1, wherein ALT is a sum of thicknesses of all the four lens elements along the optical axis and AAG is a sum of three air gaps from the first lens element to the fourth lens element along the optical axis, and the optical imaging lens satisfies the relationship: 6.900<ALT/AAG.

4. The optical imaging lens of claim 1, wherein BFL is a distance from the image-side surface of the fourth lens element to the image plane along the optical axis, T1 is a thickness of the first lens element along the optical axis and T4 is a thickness of the fourth lens element along the optical axis, and the optical imaging lens satisfies the relationship: 3.000<(T4+BFL)/T1.

5. The optical imaging lens of claim 1, wherein EFL is an effective focal length of the optical imaging lens, AAG is a sum of three air gaps from the first lens element to the fourth lens element along the optical axis, T1 is a thickness of the first lens element along the optical axis and T4 is a thickness of the fourth lens element along the optical axis, and the optical imaging lens satisfies the relationship: 3.000<(EFL+T4)/(AAG+T1).

6. The optical imaging lens of claim 1, wherein T2 is a thickness of the second lens element along the optical axis, T4 is a thickness of the fourth lens element along the optical axis, G12 is an air gap between the first lens element and the second lens element along the optical axis and G23 is an air gap between the second lens element and the third lens element along the optical axis, and the optical imaging lens satisfies the relationship: 4.500<(T2+T4)/(G12+G23).

7. The optical imaging lens of claim 1, wherein TL is a distance from the object-side surface of the first lens element to the image-side surface of the fourth lens element along the optical axis, T1 is a thickness of the first lens element along the optical axis, T3 is a thickness of the third lens element along the optical axis and G34 is an air gap between the third lens element and the fourth lens element along the optical axis, and the optical imaging lens satisfies the relationship: (G34+TL)/(T1+T3)<3.500.

8. An optical imaging lens, from an object side to an image side in order along an optical axis comprising: a first lens element, a second lens element, an aperture stop, a third lens element, and a fourth lens element, each of the first lens element to the fourth lens element having an object-side surface facing toward the object side and allowing imaging rays to pass through as well as an image-side surface facing toward the image side and allowing the imaging rays to pass through, wherein:
- the first lens element has positive refracting power; and
- an optical axis of the image-side surface of the fourth lens element is concave;
- wherein only the above-mentioned four lens elements of the optical imaging lens have refracting power;
- wherein HFOV stands for a half field of view of the optical imaging lens, and the optical imaging lens satisfies the relationship: HFOV<15.000°.

9. The optical imaging lens of claim 8, wherein EFL is an effective focal length of the optical imaging lens and ALT is a sum of thicknesses of all the four lens elements along the optical axis, and the optical imaging lens satisfies the relationship: EFL/ALT<2.500.

10. The optical imaging lens of claim 8, wherein ALT is a sum of thicknesses of all the four lens elements along the optical axis, T1 is a thickness of the first lens element along the optical axis and G34 is an air gap between the third lens element and the fourth lens element along the optical axis, and the optical imaging lens satisfies the relationship: 3.000<ALT/(T1+G34).

11. The optical imaging lens of claim 8, wherein TTL is a distance from the object-side surface of the first lens element to an image plane along the optical axis, T2 is a thickness of the second lens element along the optical axis, T3 is a thickness of the third lens element along the optical axis and G23 is an air gap between the second lens element and the third lens element along the optical axis, and the optical imaging lens satisfies the relationship: 3.500<TTL/(T2+G23+T3).

12. The optical imaging lens of claim 8, wherein EFL is an effective focal length of the optical imaging lens, T1 is a thickness of the first lens element along the optical axis and G12 is an air gap between the first lens element and the second lens element along the optical axis, and the optical imaging lens satisfies the relationship: EFL/(T1+G12)<6.000.

13. The optical imaging lens of claim 8, wherein TL is a distance from the object-side surface of the first lens element to the image-side surface of the fourth lens element along the optical axis, T2 is a thickness of the second lens element along the optical axis, G12 is an air gap between the first lens element and the second lens element along the optical axis and G23 is an air gap between the second lens element and the third lens element along the optical axis, and the optical imaging lens satisfies the relationship: 3.000<TL/(G12+T2+G23).

14. The optical imaging lens of claim 8, wherein BFL is a distance from the image-side surface of the fourth lens element to an image plane along the optical axis, T3 is a thickness of the third lens element along the optical axis and G34 is an air gap between the third lens element and the fourth lens element along the optical axis, and the optical imaging lens satisfies the relationship: 3.000<BFL/(T3+G34).

15. An optical imaging lens, from an object side to an image side in order along an optical axis comprising: a first lens element, a second lens element, a third lens element, and a fourth lens element, each of the first lens element to the fourth lens element having an object-side surface facing toward the object side and allowing imaging rays to pass through as well as an image-side surface facing toward the image side and allowing the imaging rays to pass through, wherein:
- an optical axis region of the image-side surface of the first lens element is convex;
- the second lens element has negative refracting power;
- an optical axis of the object-side surface of the third lens element is concave;

a periphery of the image-side surface of the third lens element is concave; and an optical axis of the image-side surface of the fourth lens element is concave;

wherein only the above-mentioned four lens elements of the optical imaging lens have refracting power;

wherein HFOV stands for a half field of view of the optical imaging lens and TTL is a distance from the object-side surface of the first lens element to an image plane along the optical axis, and the optical imaging lens satisfies the relationship: HFOV/TTL<1.500°/mm.

16. The optical imaging lens of claim 15, wherein EFL is an effective focal length of the optical imaging lens, BFL is a distance from the image-side surface of the fourth lens element to an image plane along the optical axis and ALT is a sum of thicknesses of all the four lens elements along the optical axis, and the optical imaging lens satisfies the relationship: (EFL+BFL)/ALT<2.800.

17. The optical imaging lens of claim 15, wherein T1 is a thickness of the first lens element along the optical axis, T3 is a thickness of the third lens element along the optical axis and G12 is an air gap between the first lens element and the second lens element along the optical axis, and the optical imaging lens satisfies the relationship: 3.000<TTL/(T1+G12+T3).

18. The optical imaging lens of claim 15, wherein BFL is a distance from the image-side surface of the fourth lens element to an image plane along the optical axis, and the optical imaging lens satisfies the relationship: TTL/BFL<3.500.

19. The optical imaging lens of claim 15, wherein an Abbe number of the first lens element is $\upsilon1$, an Abbe number of the second lens element is $\upsilon2$, an Abbe number of the third lens element is $\upsilon3$ and an Abbe number of the fourth lens element is $\upsilon4$, and the optical imaging lens satisfies the relationship: $\upsilon1+\upsilon2+\upsilon3<3*\upsilon4$.

20. The optical imaging lens of claim 15, wherein T1 is a thickness of the first lens element along the optical axis, T2 is a thickness of the second lens element along the optical axis, T3 is a thickness of the third lens element along the optical axis, G12 is an air gap between the first lens element and the second lens element along the optical axis and G34 is an air gap between the third lens element and the fourth lens element along the optical axis, and the optical imaging lens satisfies the relationship: 1.500<(T1+T2)/(G12+T3+G34).

21. The optical imaging lens of claim 1, wherein a thickness of the first lens element along the optical axis is greater than a thickness of the second lens element along the optical axis.

* * * * *